United States Patent [19]

Becker

[11] Patent Number: 4,630,975

[45] Date of Patent: Dec. 23, 1986

[54] AIR ENCASEMENT SYSTEM FOR TRANSPORTATION OF PARTICULATES

[76] Inventor: John H. Becker, 100 Orchard St., Auburn, N.Y. 13021

[21] Appl. No.: 683,012

[22] Filed: Dec. 18, 1984

Related U.S. Application Data

[63] Continuation-in-part of Ser. No. 540,313, Oct. 11, 1983, abandoned.

[51] Int. Cl.[4] .................... B65G 53/18; B65G 53/28; B65G 53/60

[52] U.S. Cl. .................................... 406/85; 406/88; 406/89; 406/92; 406/95; 406/171; 406/173

[58] Field of Search .................... 406/45, 84, 85, 86, 406/88, 89, 91, 92, 94, 95, 109, 171, 173

[56] References Cited

U.S. PATENT DOCUMENTS

| | | | |
|---|---|---|---|
| 2,580,581 | 1/1952 | Niemitz | 406/173 X |
| 2,794,686 | 6/1957 | Anselmen et al. | 406/92 X |
| 2,882,097 | 4/1959 | Hamren | 406/89 X |
| 3,537,755 | 11/1970 | Schmidt | 406/95 |
| 4,138,047 | 2/1979 | Sherman | 406/88 X |

FOREIGN PATENT DOCUMENTS

| | | | |
|---|---|---|---|
| 470622 | 1/1929 | Fed. Rep. of Germany | 406/92 |
| 1150320 | 6/1963 | Fed. Rep. of Germany | 406/89 |
| 8200451 | 2/1982 | PCT Int'l Appl. | 406/173 |
| 2038750 | 7/1980 | United Kingdom | 406/95 |
| 215084 | 11/1965 | U.S.S.R. | 406/171 |

*Primary Examiner*—Joseph F. Peters, Jr.
*Assistant Examiner*—MaryBeth O. Jones
*Attorney, Agent, or Firm*—Thompson, Birch, Gauthier, Samuels, Stevens & Kehoe

[57] ABSTRACT

A method for transporting particulates wherein the particulates are entrained in a transport air stream. An energizing air stream is introduced into the pipeline to form an air encasement stream between the inner wall of the pipeline and the transport air stream. The air encasement stream is introduced into the pipeline opposite directions to form a forward leaning movement of encasement air at a higher velocity than the transport air.

25 Claims, 29 Drawing Figures

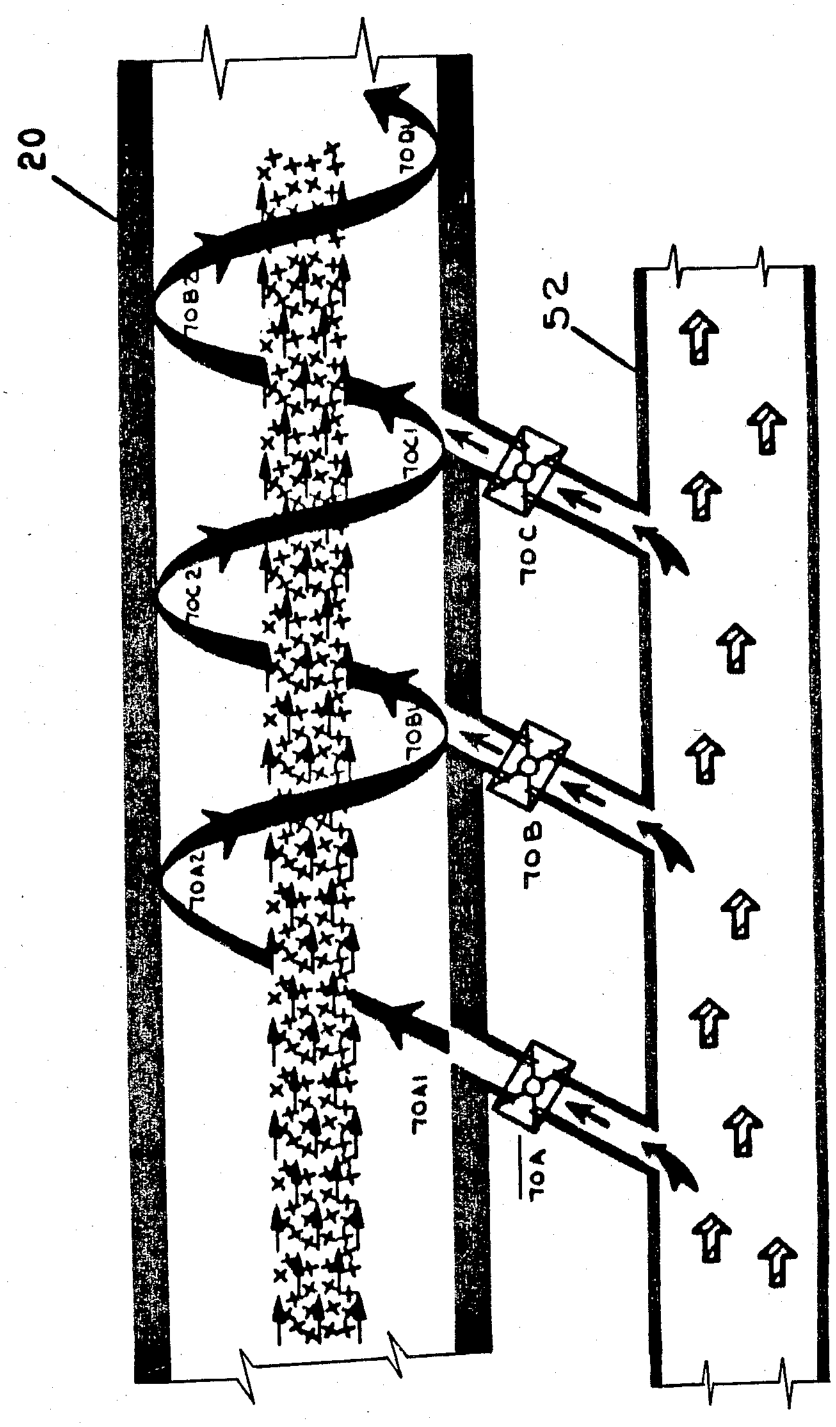
FIG: 13

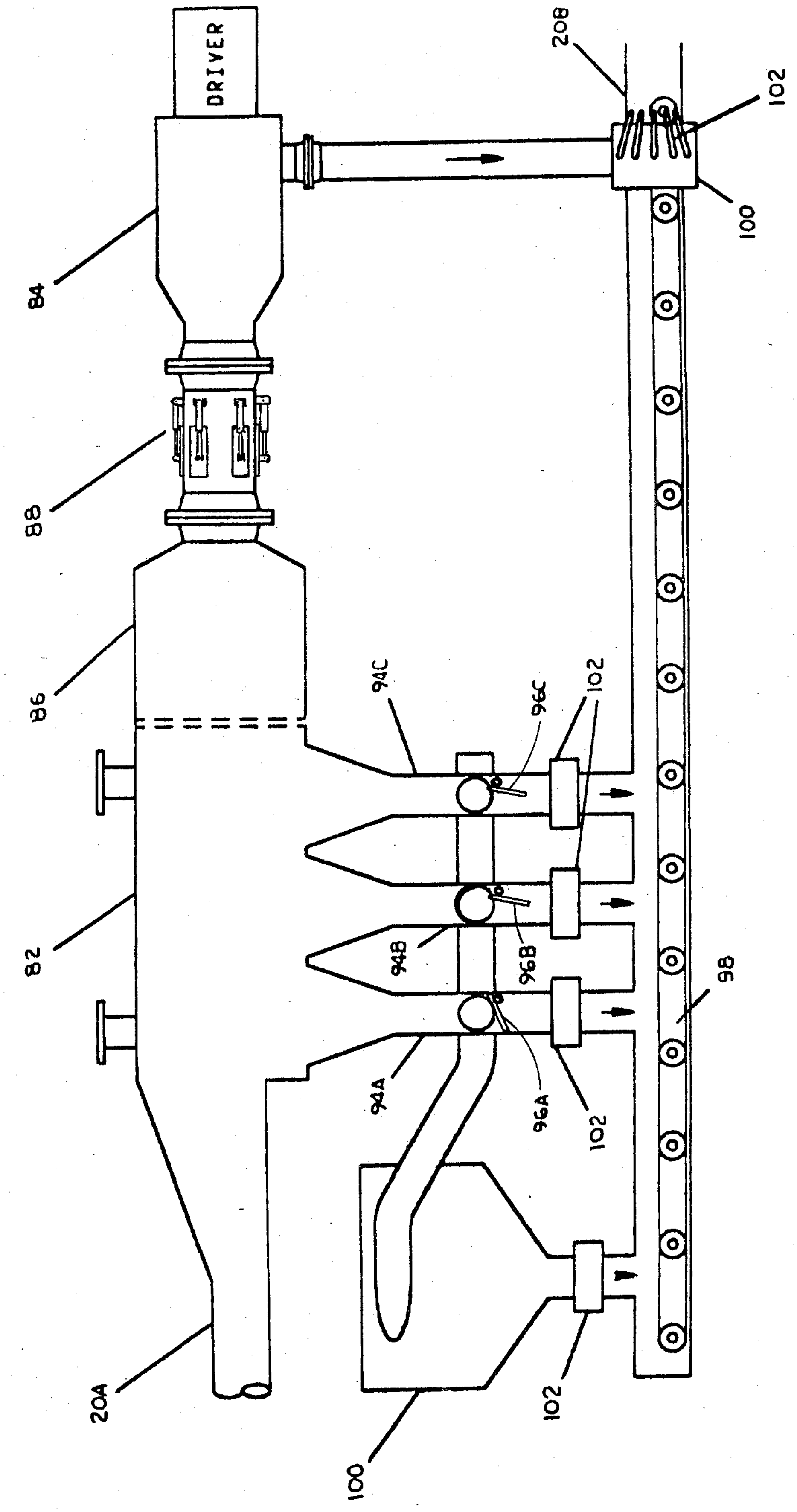
FIG: 14

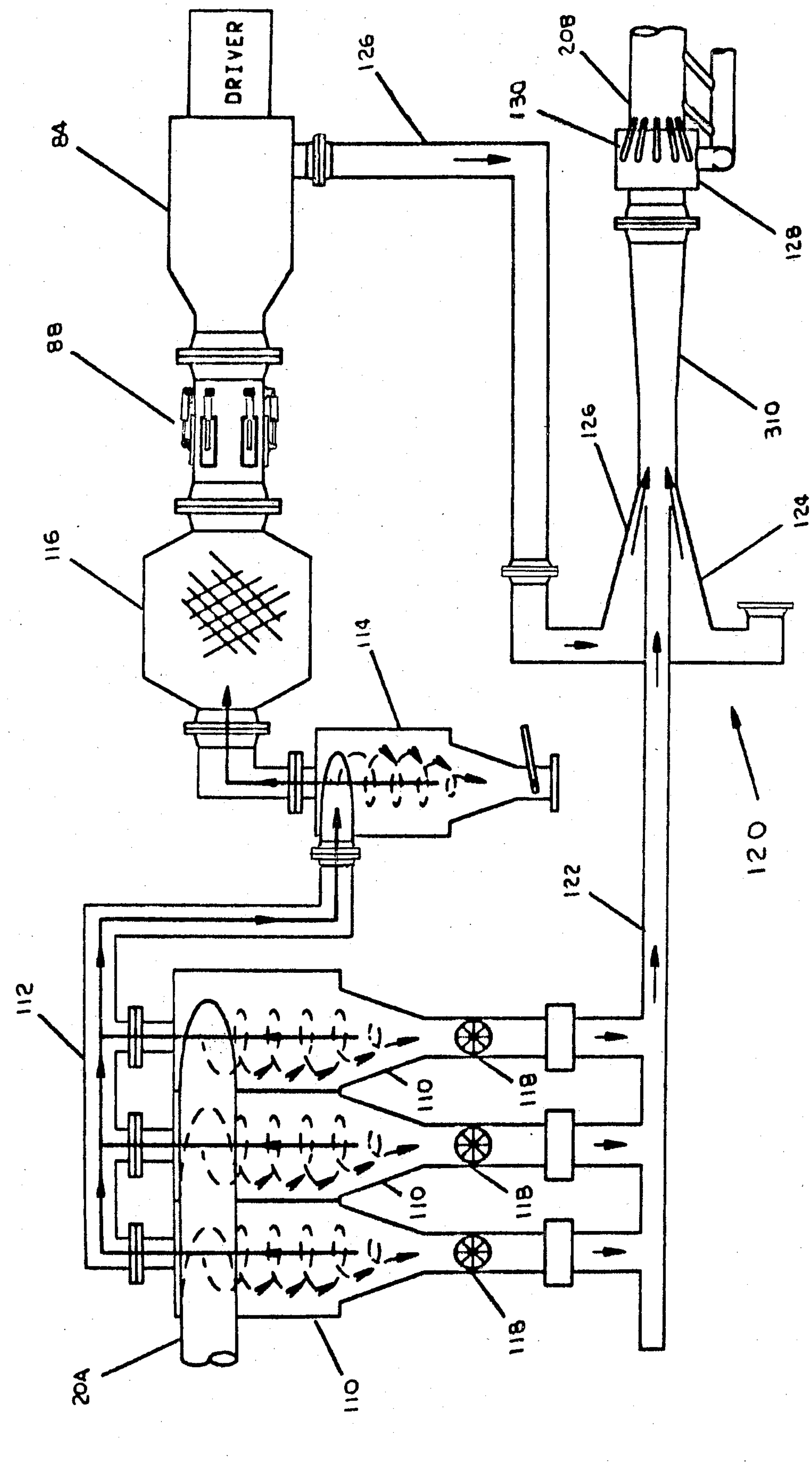
FIG: 15

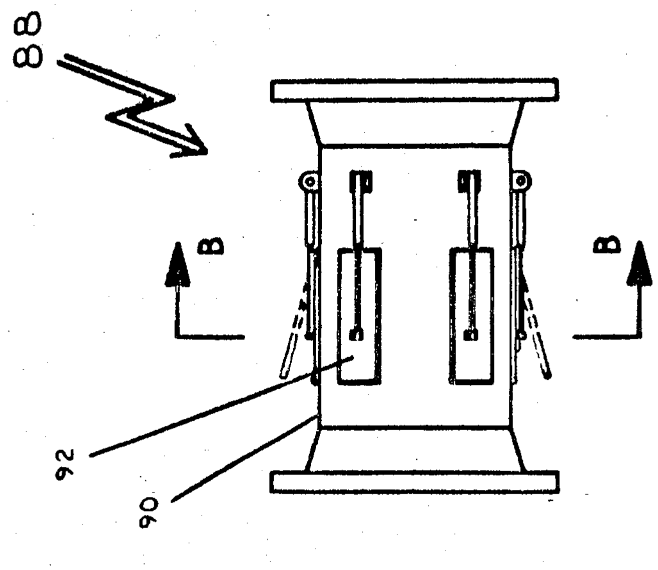
FIG: 16
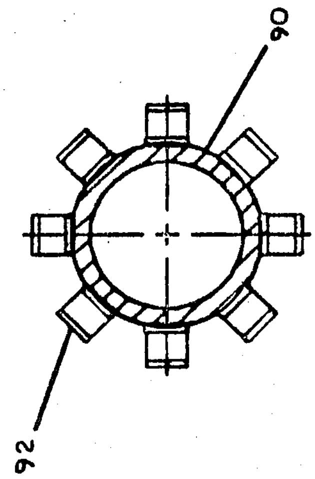
FIG: 17

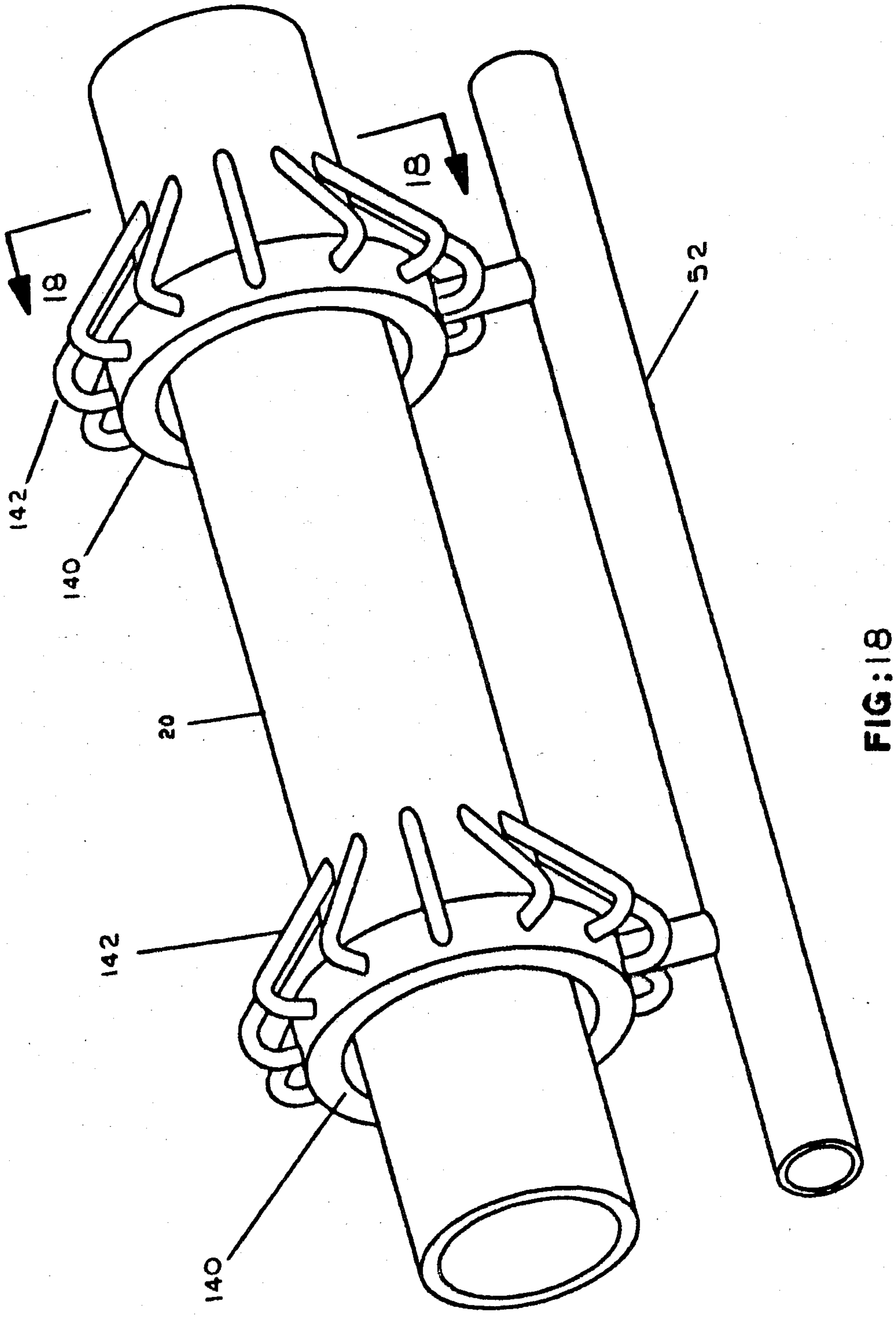
FIG:18

FIG: 21

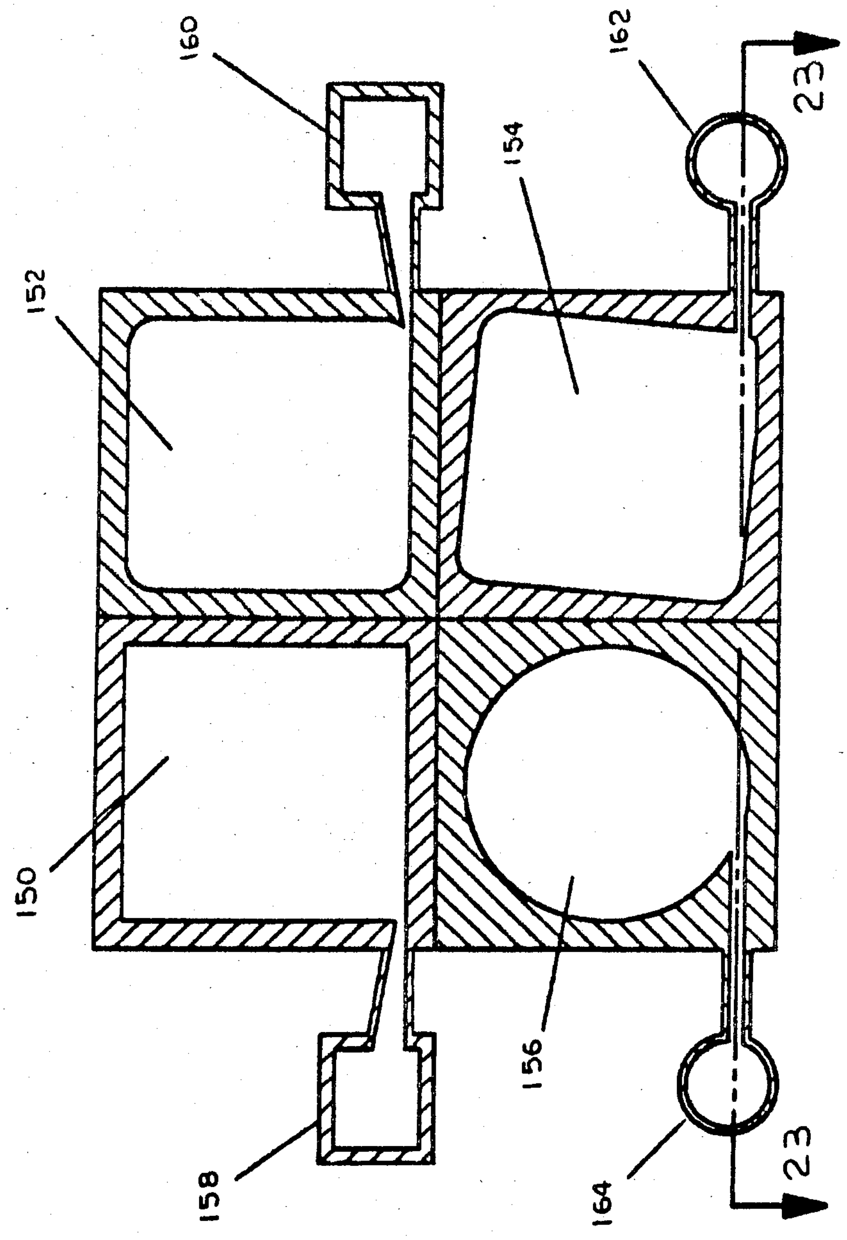
FIG: 23

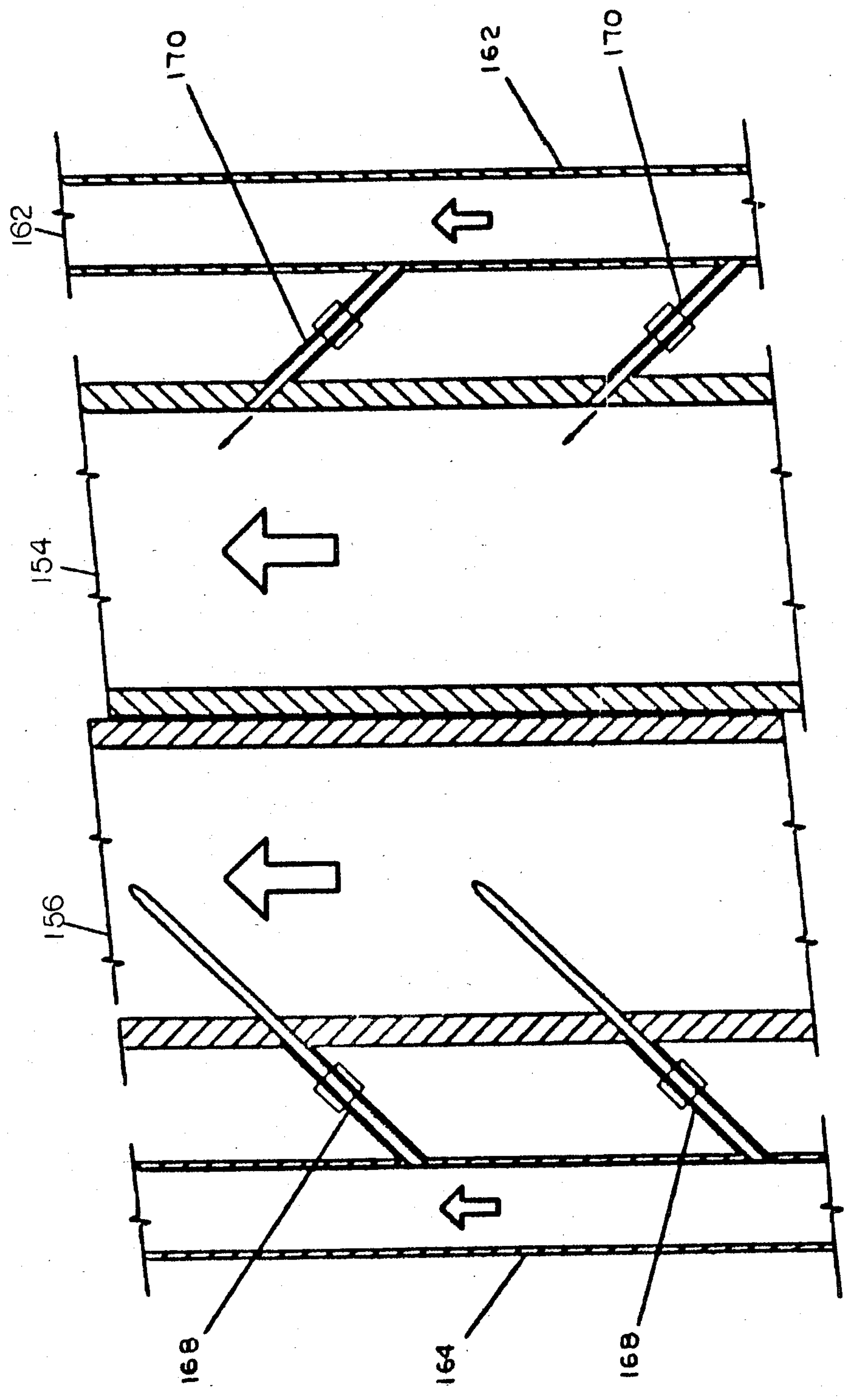
FIG: 24

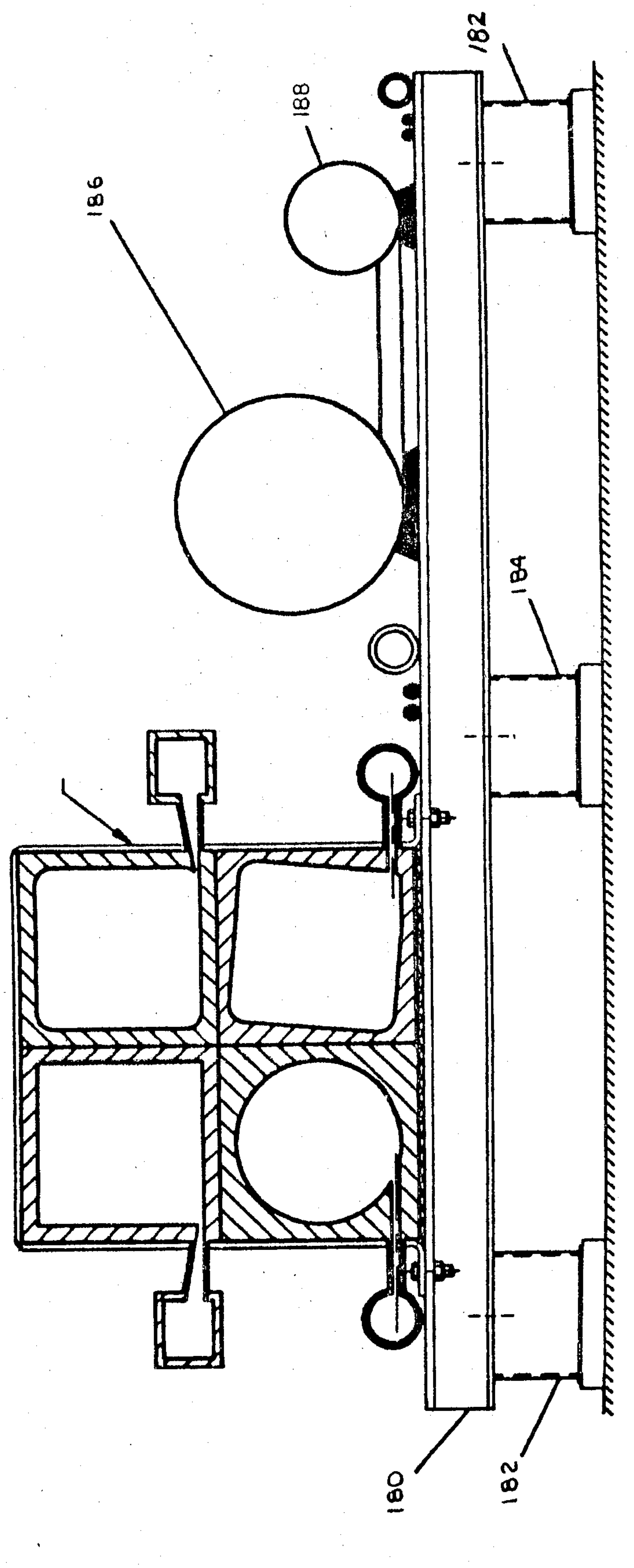
FIG: 25

AIR ENCASEMENT SYSTEM FOR TRANSPORTATION OF PARTICULATES

CROSS REFERENCE TO RELATED APPLICATIONS

This application is a continuation-in-part application of Ser. No. 540,313 filed Oct. 11, 1983, now abandoned.

BACKGROUND AND BRIEF SUMMARY OF THE INVENTION

The invention relates to the pneumatic conveyance of particulate material and expressly describes a method for the transportation of grain through a pipeline over long distances.

Currently, grain products are transported long distances to shipping ports by the use of rolling stock, vehicles and other equipment. The most common method of shipping grain is transporting it by rolling stock to a shipping port where it is transferred to ships after lengthy storage periods in large structured silos. Prior to the pick up of the grain and during the transportation period, grain particulates absorb moisture which must be removed by a heating process at the silo location. Such a process may require many days, even weeks, before being loaded into the ships. The Mechanical Handling and Storing of Materials by G. F. Zimmer, 1922, Third Edition, D. Van Nostrand Company, New York, describes various hydraulic pneumatic systems for handling grain. Other prior art in this field is U.S. Pat. Nos. 2,795,464, 2,806,636, 2,827,333, Canadian Pat. Nos. 980,529, 1,032,991, 1,153,043 and the Fuller System (General American Transit) wherein dry cement is moved through a conduit with dry air flowing through the floor of the conduit.

The current method of transportation involves the use of large sums of capital which are invested in rolling stock, expensive trackage and huge storage facilities. The estimated expenditures for the next ten years in Canada alone is expected to be $16,000,000,000.

The present invention is directed to a method and system for transporting particulate material and particularly grains via pneumatic means, using a dual pipeline system. More particularly the grain is transported through a larger transport pipeline entrained in a transport air stream. A smaller energizing pipeline introduces air into the transport pipeline whereby a pulsating-air encasement is interposed between the conduit wall and the transport air stream to inhibit precipitation of the grain from the transport air stream.

In the flow of a gaseous stream through a uniform nonbaffled conduit, the flow of the gas as it approaches the conduit wall becomes lamina and at the conduit wall the flow for practical purposes is near zero. When a gaseous stream carries entrained particulates, they will migrate outwardly from the centre of the stream and ultimately precipitate from the stream. For short distances with an extremely high flow rate it may be possible to keep most of the particulates entrained but depending upon particle size there will still be some precipitation.

In the present invention, an encasement of pulsating gas, or air at a higher velocity than the transport air stream and at a variety of pressures and volumes, is introduced between the wall of the transport pipeline and the transport air stream carrying the particulates to form a pulsating air encasement.

Generally, a pipeline conduiting system is provided wherein the grain (or other particulates) are moved pneumatically at varying speeds using high volumes of air supplied by compressors and drivers installed at regular intervals throughout the pipeline system. In the preferred embodiment, the gases within the conduit are temperature controlled allowing the grain or particulates to retain their original physical charactristics and nutritional values until reaching their destination. A transport air stream carries the grain particulates at modest pressures and average velocities to prevent damage to the grain. A dense pack ratio, by volume of grain to air, ranges generally up to 50%. Preferably, about a 30% ratio is employed to prevent plugging of the pipeline. At a plurality of locations along the transport pipeline air is injected into the transport pipeline from a separate, energizing auxiliary pipeline system.

Preferably this air is introduced via air volume variance diffuser plates containing distinctive orifices of pre-determined sizes, angles and locations. The air discharge from these plates forms the pulsating air encasement. These plates are preferrably positioned in the lower quadrant of the transport pipeline. The injected energized air may vary substantially in volume and cfm dense weight, at each location, by the use of rotary pulsating valves controlled by appropriate signals from associated counters, lazer beams and computers. These pulsating air encasements will reduce the wall bumping of the grain and can be temperature and humidity controlled for at least two purposes; to enhance the drying of the grain as it moves along the pipeline and to insure a controlled temperature range as the pipeline will be subject to varying climatic conditions. The introduction of this energized air which forms the pulsating air encasement is also to insure no drag or unnecessary pressure drop on the transport air stream. In a particularly preferred embodiment booster air is introduced from the central portion of the plate to prevent a 'duning effect' and enhance control of the flow of the particulate.

The pulsating air encasement assumes a flow pattern similar to a heart-shaped helix as illustrated in FIG. 10. The encasement prevents or inhibits the precipitation of the particulates by maintaining, at the inter-mingled interface between the transport air stream and the encasement, a positive inwardly directed pressure.

In an alternate embodiment, a pulsating air encasement is formed by introducing at a plurality of axially spaced locations energizing air. The net effect is to form a high pressure pulsating air encasement and to create a pressure differential between the transport air and the pulsating air encasement as shown in FIG. 13.

In the preferred embodiment, grain such as wheat, maize or oats is drawn through the primary pipeline by compressor/driver stations which create a push-pull driving force. The grain in the transport airstream bypasses the compressor/driver station.

In an alternative embodiment, the compressor/driver station creates a pull only, pneumatic driving force. In this alternative embodiment, the grain again bypasses the compressor/driver station. In a still further embodiment of the invention, the compressor/driver stations creates a push pneumatic driving force.

The method of my invention includes moving a transport air stream through a pipeline, said airstream having entrained particulates therein, encasing the transport air stream is a pulsating air stream, the pulsating air encasement maintained at a greater pressure than the transport air stream and moving at a greater velocity than the transport air stream to prevent precipitation of the particulates from the transport air stream.

BRIEF DESCRIPTION OF THE DRAWINGS

FIG. 13 is an alternate embodiment of the encasement feature;

FIG. 14 is an illustration of a mechanical by-pass separator-compressor/driver station;

FIG. 15 is an illustration of a pneumatic by-pass of the compressor/driver station;

FIG. 16 is a side view of a make-up air injector spool;

FIG. 17 is a cross-sectional view of FIG. 16 taken along line B—B of FIG. 16;

FIG. 18 is a perspective illustration of an alternative embodiment of the invention;

FIG. 23 is a schematic illustration of the configurations of FIG. 22 joined together in a multi-pipe system;

FIG. 24 taken along lines 23—23 of FIG. 23 is a sectional plan view of a primary air-solids pipeline with attached secondary lines; and FIG. 25 is a front partially sectional view of a typical field installation of a multi-pipeline system.

DESCRIPTION OF THE PREFERRED EMBODIMENT

Figure 1:
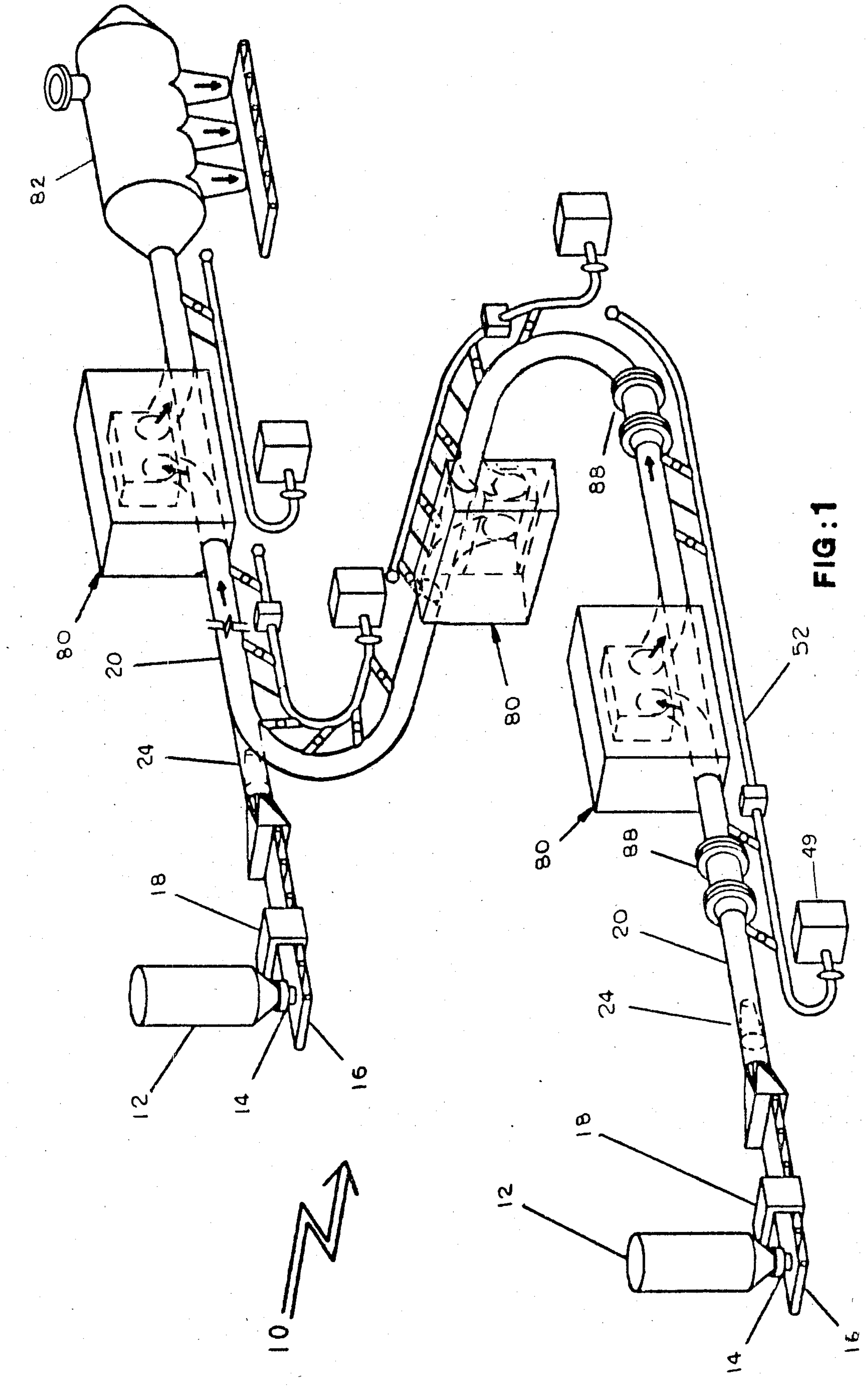
FIG. 1 is a schematic of an embodiment of the invention.

FIG. 1 illustrates a system 10 embodying the invention. A loading silo 12 filled with grain has secured at its lower end a rotatable dispenser 14 which deposits the grain on a synchronous conveyor belt 16. The rotatable dispenser 14 and conveyer belt 16 function in combination to control the size and amount of grain deposited on the moving conveyor belt. This is to insure a controllable feed rate of the grain. The conveyor belt 16 passes through an electric weight measuring and scanning device 18. A transport pipeline 20 has in communication therewith a pipe line separater-compressor/driver stations 80. These stations separate the grain from the transport air stream.

Figure 10:
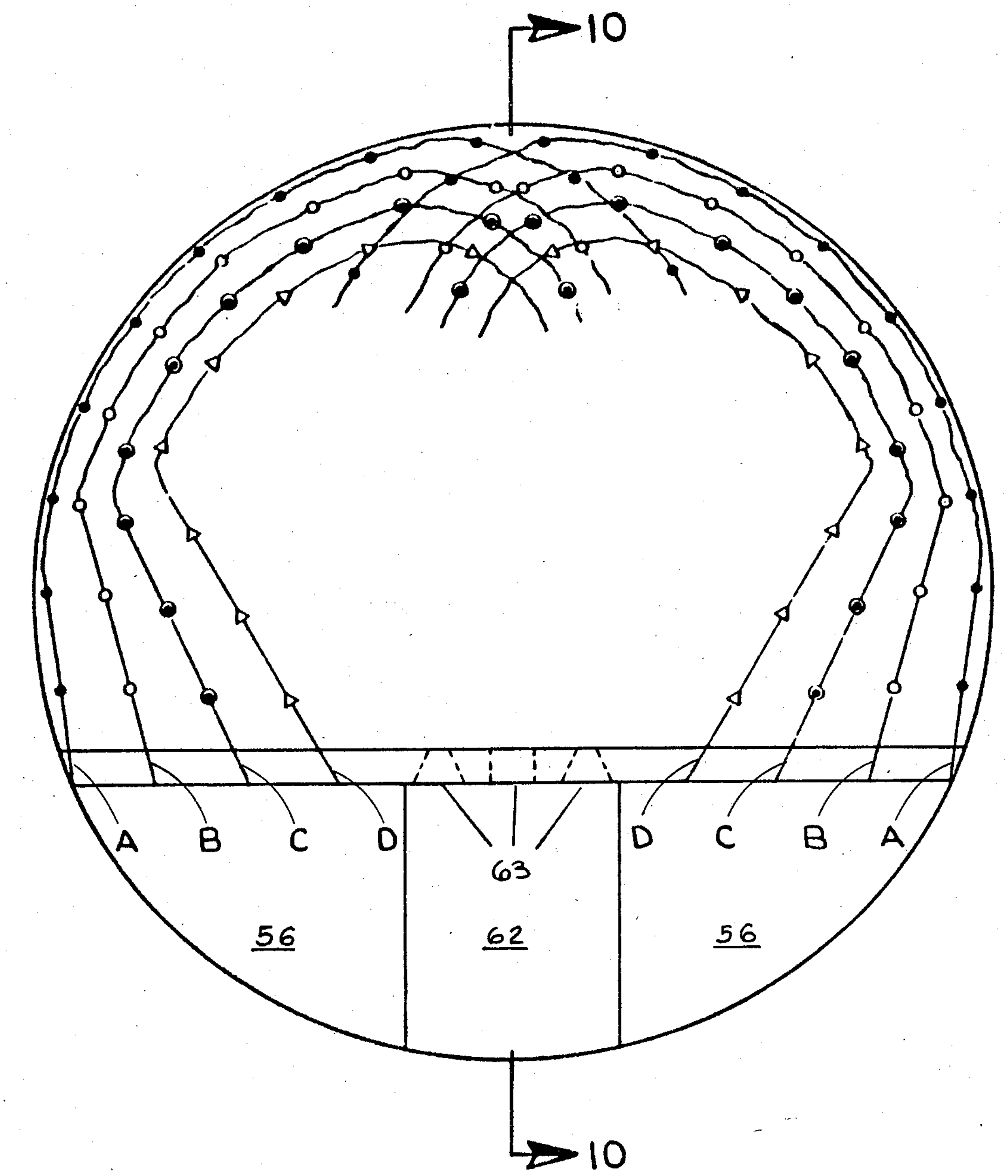
FIG. 10 is an end view of FIG. 8 the energizing air encasement inside the transport cargo pipeline.
Figure 11:
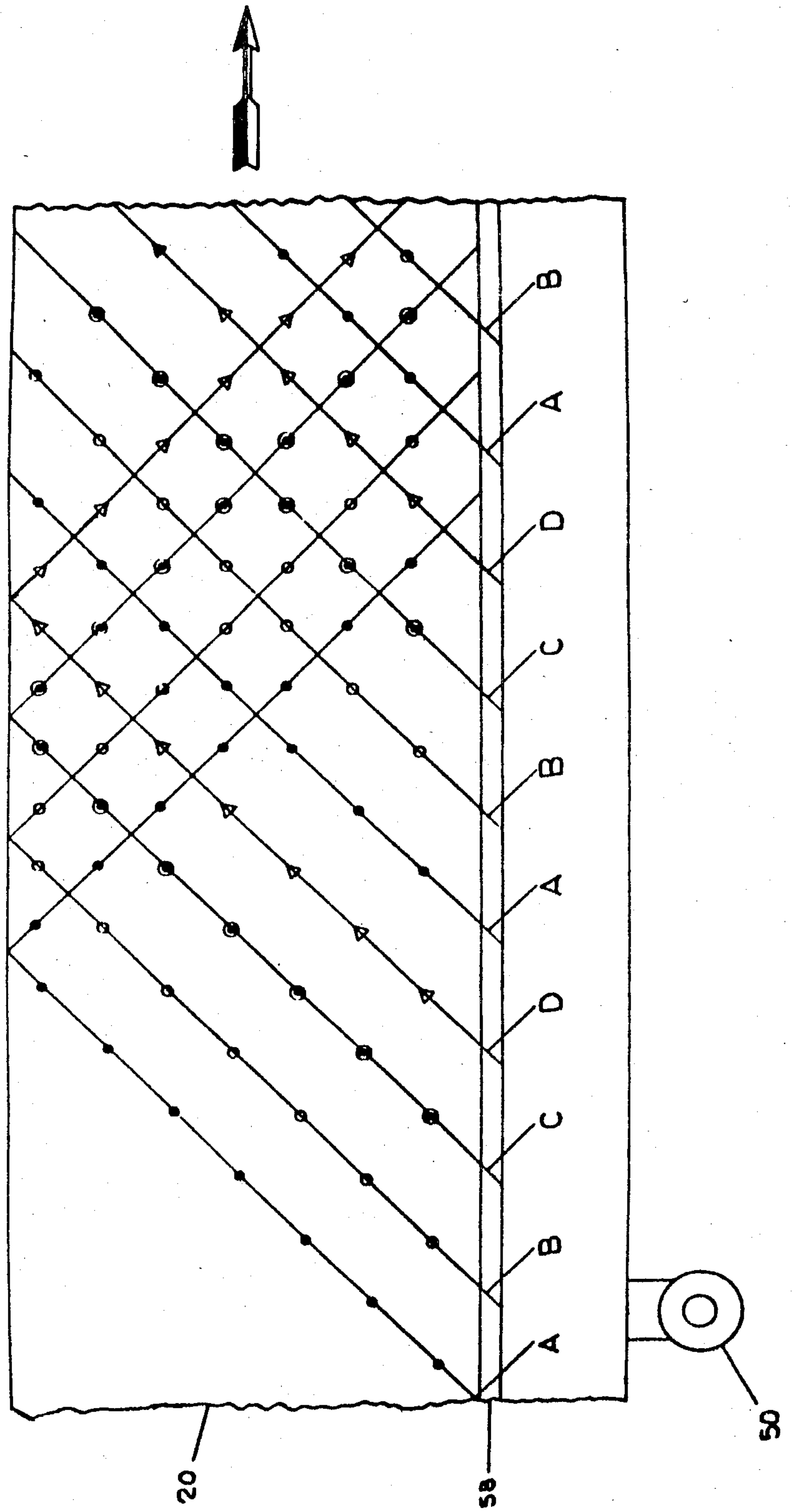
FIG. 11 is an side view of the encasement shown in FIG. 10.

The conveyor belt 16 extends into the mouth of a fixed or variable vortex valve opening 24 where the grain is "swept" off the end of the conveyor belt and into the primary pipeline 20. FIGS. 10 and 11 illustrate the air flow of the system 10.

Figure 2:
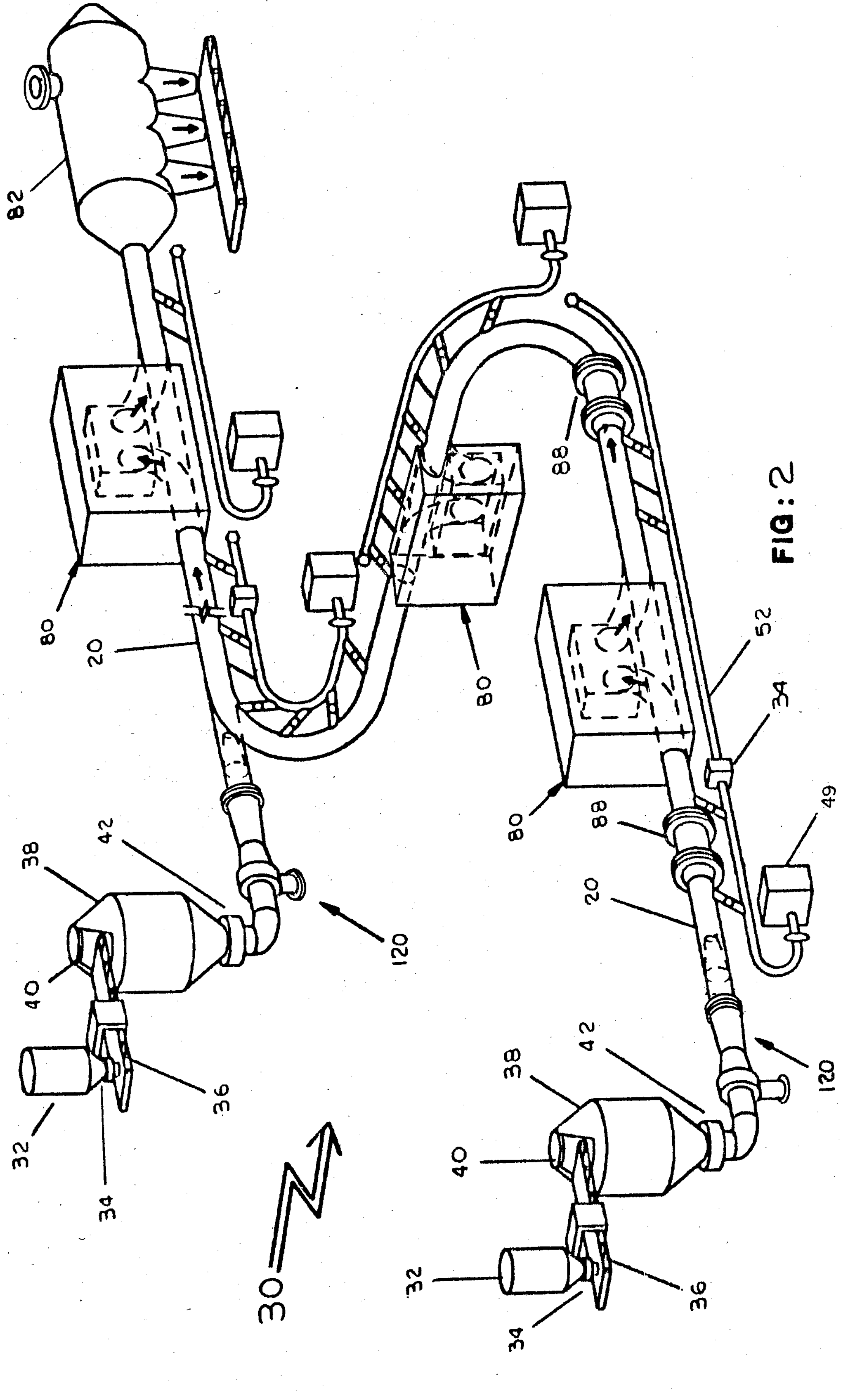
FIG. 2 is a schematic of an alternate of FIG. 1.

FIG. 2 illustrates an alternate system 30 where the particulate material is received in a hopper/silo 32 from railway hopper cars, trucks, etc., and is dispensed by valve 34 onto a mechanized weighing conveyor 36 and is discharged into a receiver bin 38 which can be a pressurized silo or at atmospheric pressure. If a pressurized silo is desired, then a rotary airlock system 40 can be used and the particulate will discharge out of the bottom where the feed rate is controlled by the speed of rotation of a segmented compartment valving arrangement 42. The discharged, measured particulate enters an entrainment mechanism 120 shown in greater detail in FIG. 15.

The various compressors/drivers, air conditioning units, etc., previously described are individual state-of-the-art devices and need not be described in detail. The compressors/drivers are readily available such as from Ingersoll-Rand.

Figure 3:
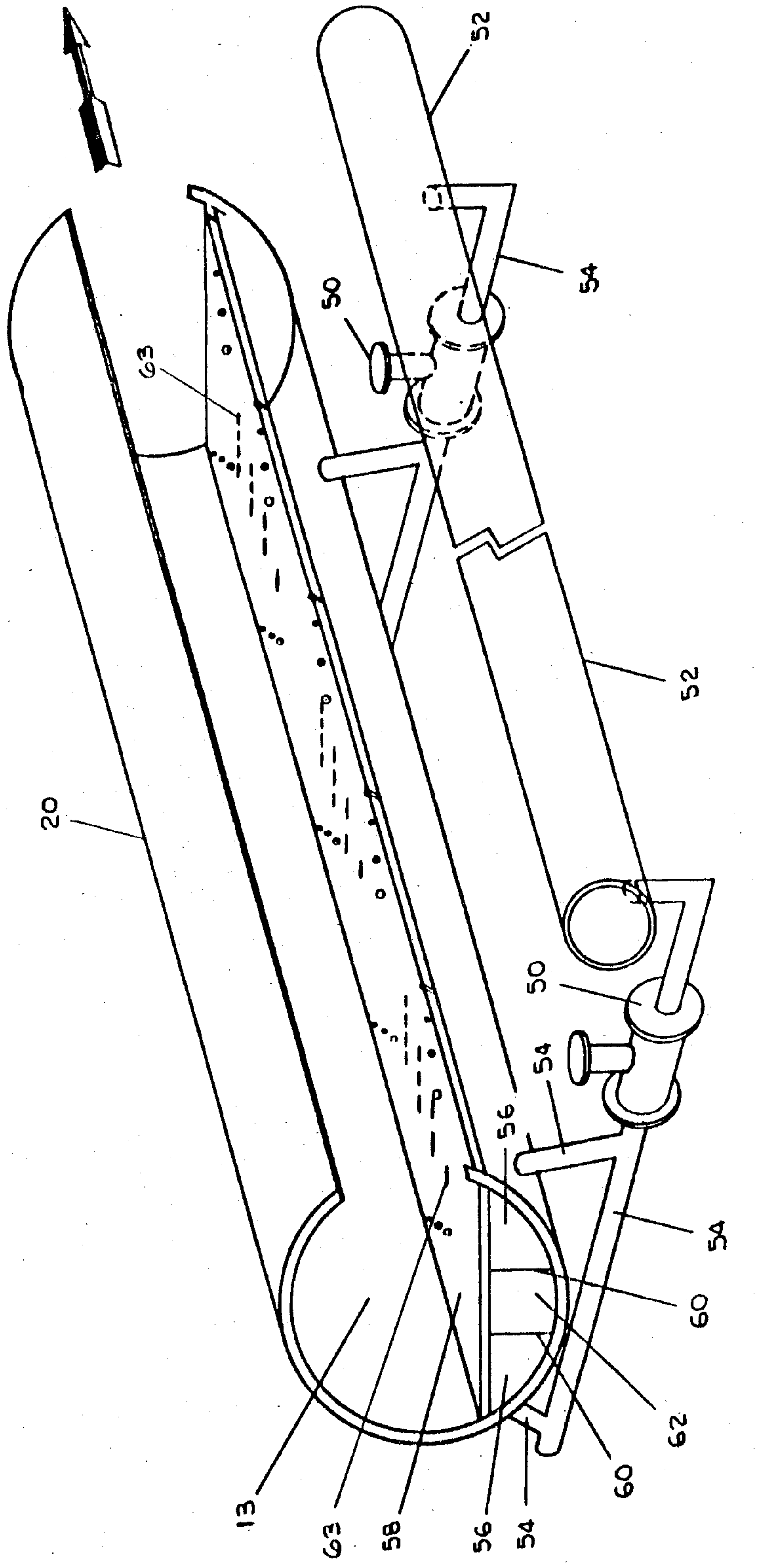
FIG. 3 is a schematic of an air/gas volume variance diffuser plate installed in a transport cargo pipeline.

In the preferred embodiment of the invention referring to FIG. 3, pulsating rotary valves 50 introduce air and/or gas taken from an energizer pipe 52 through connecting pipes 54 into energizer chambers 56 up through an air and/or gas volume variance diffuser plate 58. The variance diffuser plate 58 contains many orifices of predetermined size, angle forward, and angle tilted towards the wall and spaced longitudinally along the plate itself, which plate is fastened to the pipeline at 60. The plate 58 defines with the inner wall of the pipeline 20 and support plates 60, the energizer chambers 56 and a booster chamber 62. The chamber 62 between the support plates is energized. The plate 58 also includes apertures 63 or slots all leaning forward. The chamber 62 acts as a booster to assist the forward movement of the particulate and to ensure particulate encasement to prevent the duning effect. For example, if the particulate begins to sag in its flow path towards the diffuser plate the pressure in chamber 62 can be altered to prevent separation or duning. If the particulate rises in the cargo pipe toward the upper wall the pressure level in the chambers 56 can be decreased to nullify this effect. The pressure differential in the booster chamber 62 and the energizing chambers can be altered independently or in concert with each other to correct any adverse effects including duning, cargo movement, particulate speed, pressure buildup and temperature control. The booster chamber also assists the stop/start capability of the cargo in the transport pipeline. The booster chamber 62 is energized mainly by the power units (compressors and turbines, of the transport cargo line) but may be further inter-connected to the energizing pipe 54, through a connection as shown in FIG. 4B.

Figures 4A, 4B:
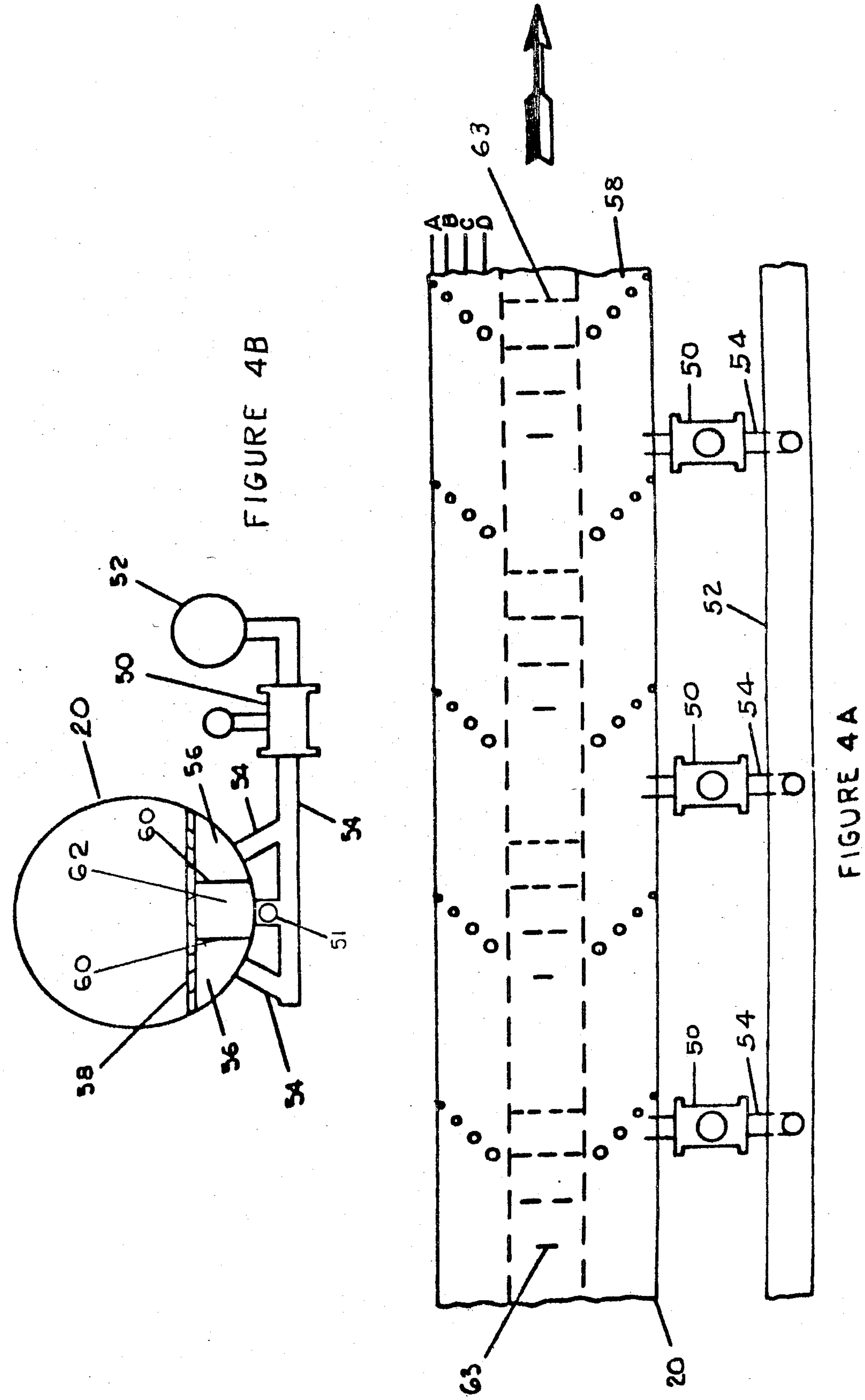
FIG. 4A is a plan view of a section of the transport line-energizer pipe.
FIG. 4B is an end view of the transport line-energizer pipe.
Figure 5:
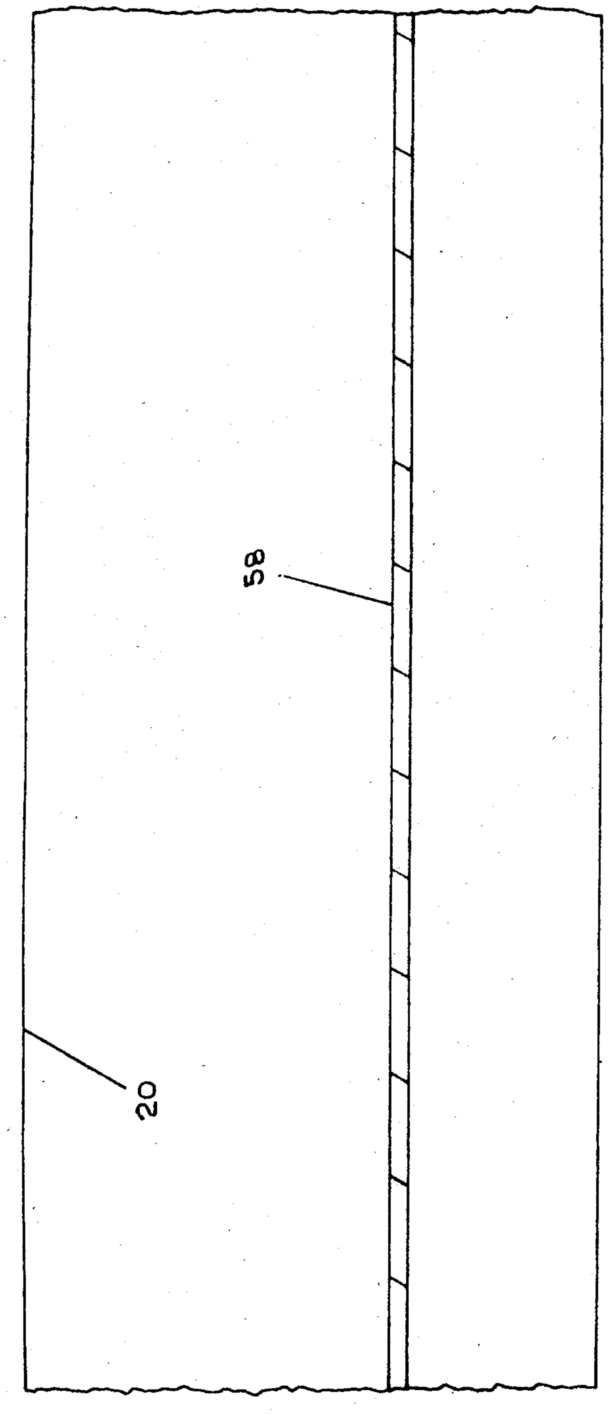
FIG. 5 is a side sectional view of the transport line.

FIGS. 4A, 4B and 5 are further views of the embodiment represented in FIG. 3.

A detailed explanation of the volume variance diffuser plate follows in reference to FIGS. 6 to 11.

Figure 6:
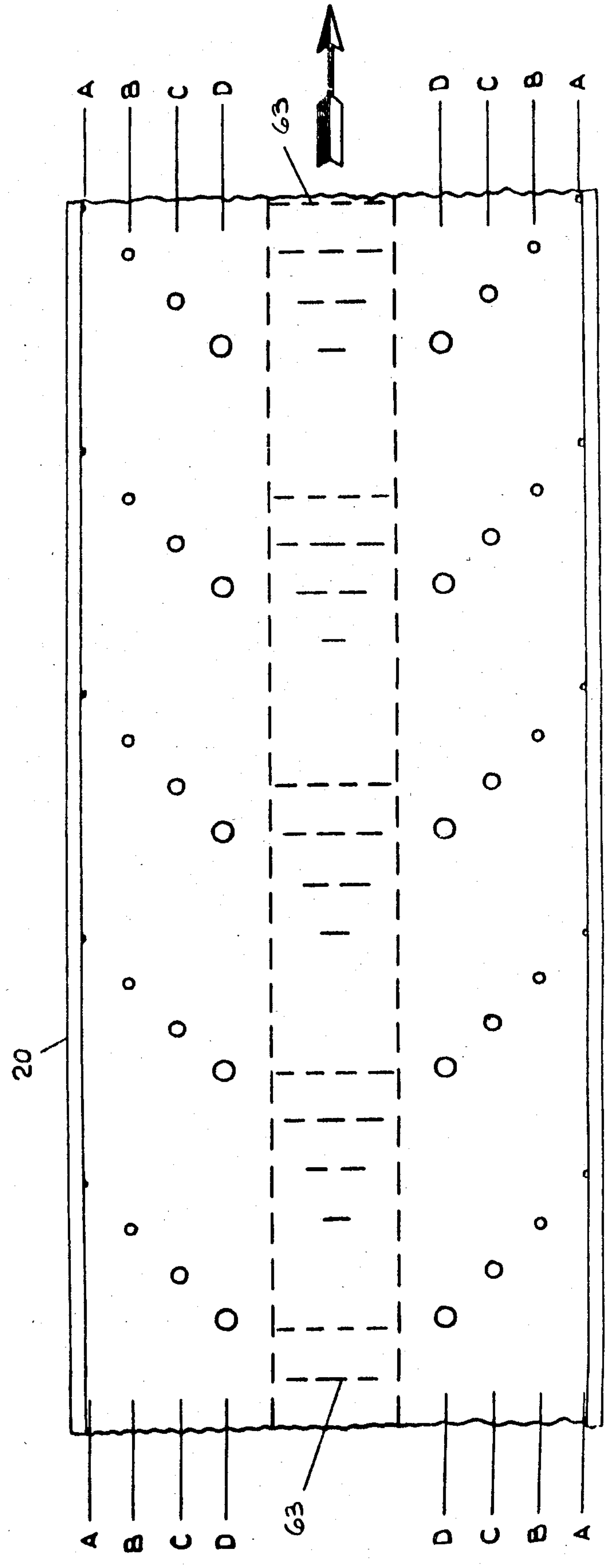
FIG. 6 is a plan view of a diffuser plate showing various sizes of orifices aligned longitudinally in systematic rows.

Referring to FIG. 6, the plan view shows sets of orifices A, B, C, and D which vary in diameter, the leaning forward angle (generally 45 degrees) and the angle of tilt outward toward the wall of the pipeline 20. The orifices of each row are equidistant one to the other and each row is parallel to the longitude axis of the transport pipe 20.

FIG. 6
ILLUSTRATION OF ARRANGEMENT

| ROWS | ORIFICE DIA | ANGLE OF FORWARD LEAN | ANGLE OF OUTWARD TILT |
|---|---|---|---|
| A | 1 mm | 45° | 0°-10° |
| B | 2 mm | 45° | 30° |
| C | 3 mm | 45° | 45° |
| D | 4 mm | 45° | 60° |

Transversing across the centre line to the opposite wall of pipeline 20 the alignment of orifice sizes in the air/gas diffuser plate is in the reverse order—as shown in FIG. 6 namely;

| | | | |
|---|---|---|---|
| D | 4 mm | 45° | 60° |
| C | 3 mm | 45° | 45° |
| B | 2 mm | 45° | 30° |
| A | 1 mm | 45° | 0°-10° |

The volumetric air discharge through each orifice at 50 psig is calculated as:

| ROW NO. | A | B | C | D |
|---|---|---|---|---|
| size mm | 1 | 2 | 3 | 4 |
| cfm psig | 1.0 | 4.01 | 9.03 | 16.1 |

Figure 7:
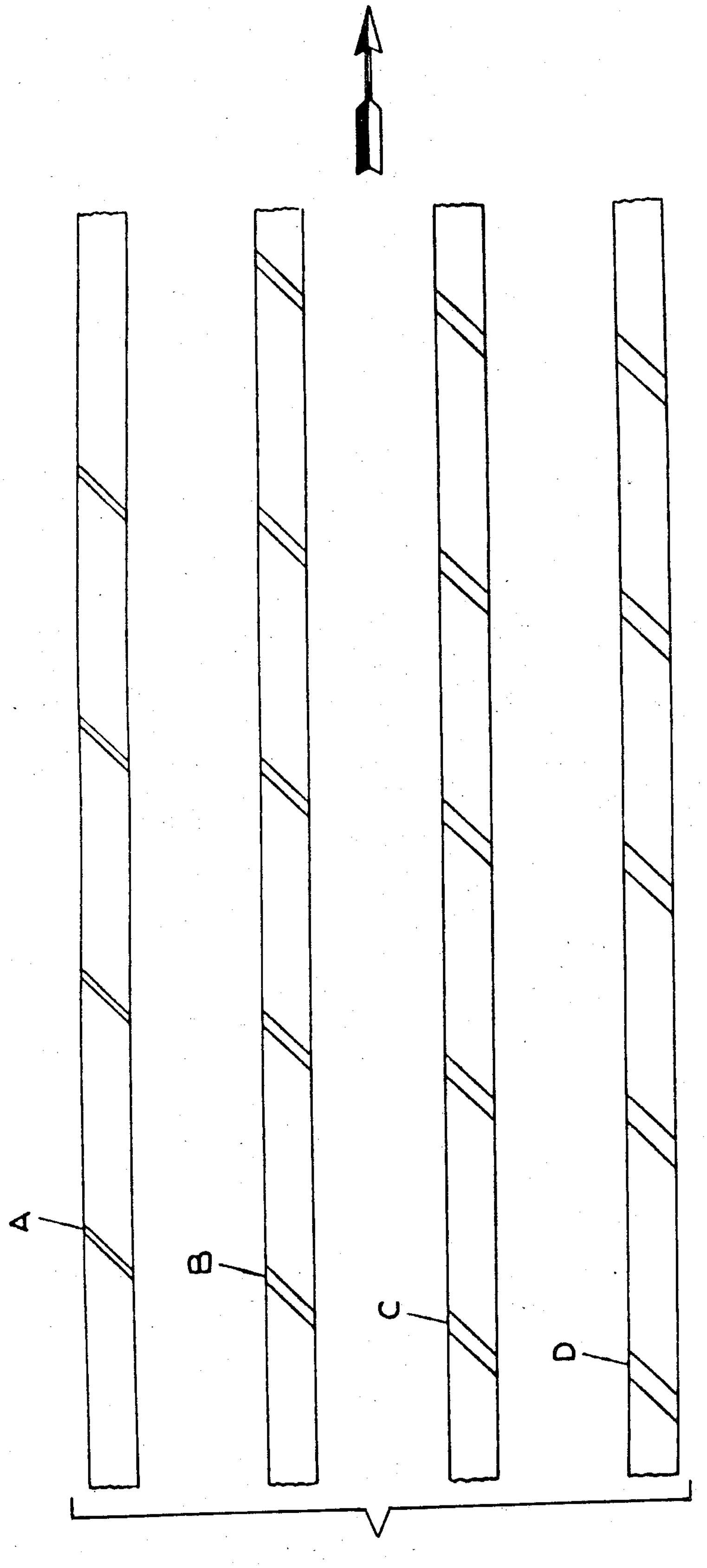
FIG. 7 is an edge view of FIG. 6 taken through sections A—A, B—B, C—C, and D—D.
Figure 8:
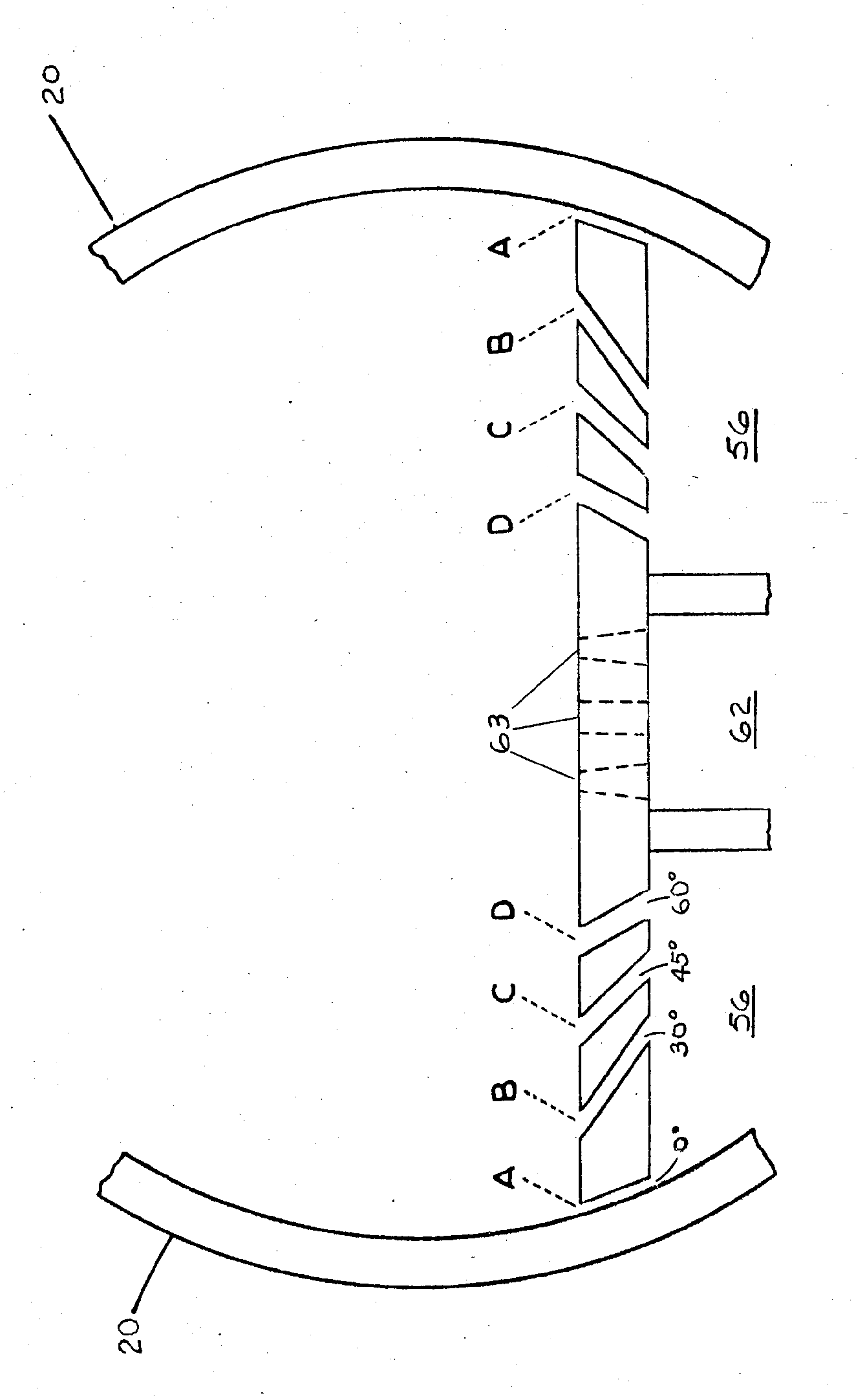
FIG. 8 is an end view of FIG. 6.

FIG. 7 is a further sectional illustration of the forward angles and FIG. 8 shows the outward lean angles respectively of the orifice of rows A–D of FIG. 6 respectively.

Figure 9:
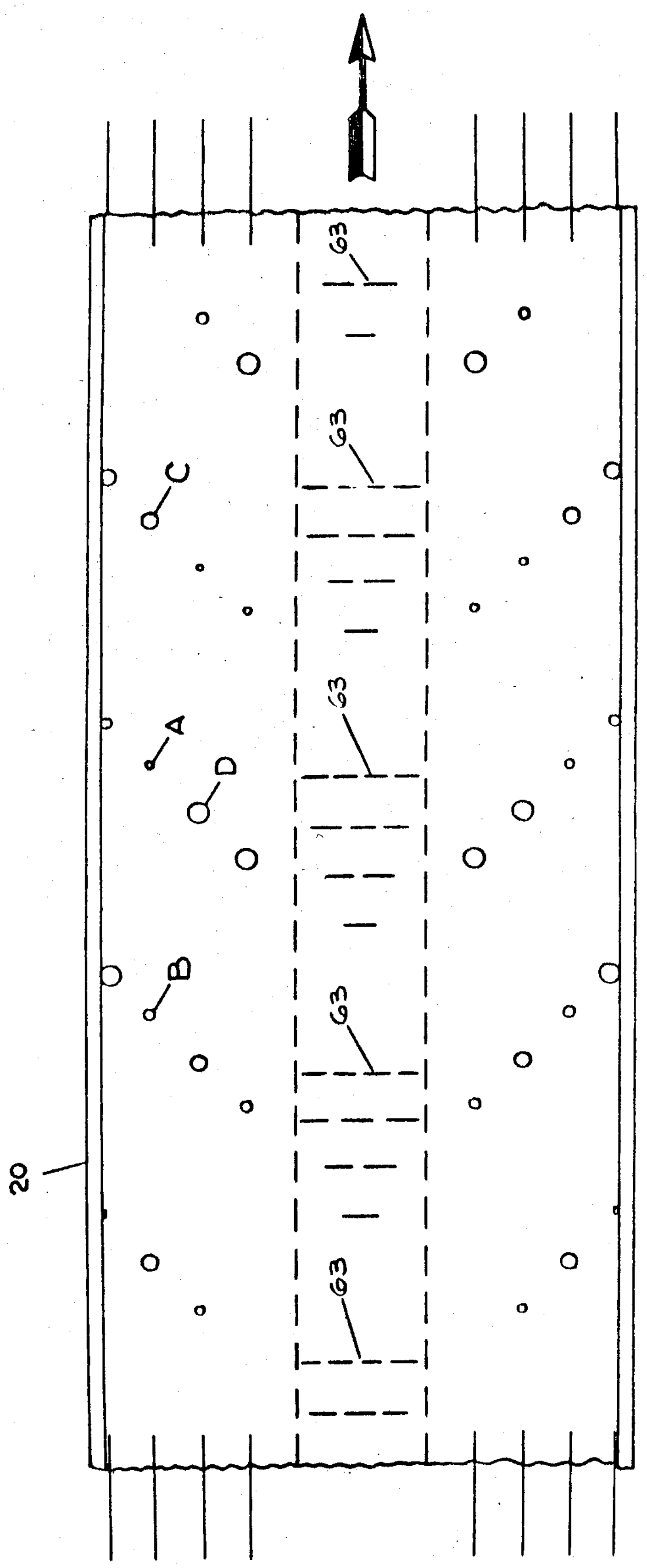
FIG. 9 is a plan view of a diffuser plate showing various hold sizes—randomly located in longitudinal rows.

FIG. 9 shows the diffuser orifices nonaligned by size and dimension which are randomly mixed as illustrated. The orifice location is randomly placed, and the forward tilt is generally 45°, however, it need not be. The outward tilt of each row may be the same as FIG. 8 regardless of the hole size or diameter; approximately, i.e. (A) 0°-10°, (B) −30°, (C) −45°, and (D) −60°. The orifices in a diffuser plate may assume any geometric configuration or shape, uniform or non-uniform concerning both size and location of the orifices one to the other. Further the orifices may assume any angular forward and/or sideward orientation as long as the net effect is to create a pulsating air encasement. Similarly, the apertures 63 although shown as slots may assume other configurations and may lean foward at any angle. It is believed the apertures may in some instances be a few millimeters in diameter. These apertures may be formed directly in the plate or formed in composites or inserts which are then received in the plate.

The flow pattern, as shown in FIG. 10, from the orifices in the plate of FIGS. 6–9 is a helical forward movement of the emission from each orifice. The flow pattern from the apertures is a forward and upward movement. FIG. 11 illustrates the emissions from each orifice. The resultant flow pattern is a forward moving helix plus the outward lean, which results in a heart shaped pattern as shown in FIG. 10 at the top of the pipeline 20. (Air flow from apertures not shown in FIG. 11.)

The pulsating mode results from the size of the orifice(s), its location and its proximity to the air volume (cfm) emitted from each associated orifice. The effect of the cargo movement will produce a "breaking up" of the cargo mass by introducing a tumbling effect due to the ever changing cfm emission from various orifice diameter(s). The resultant effect is pulsation, which pulsating is further augmented by the pulsating/energizing valve 50 described herein.

Figure 12:
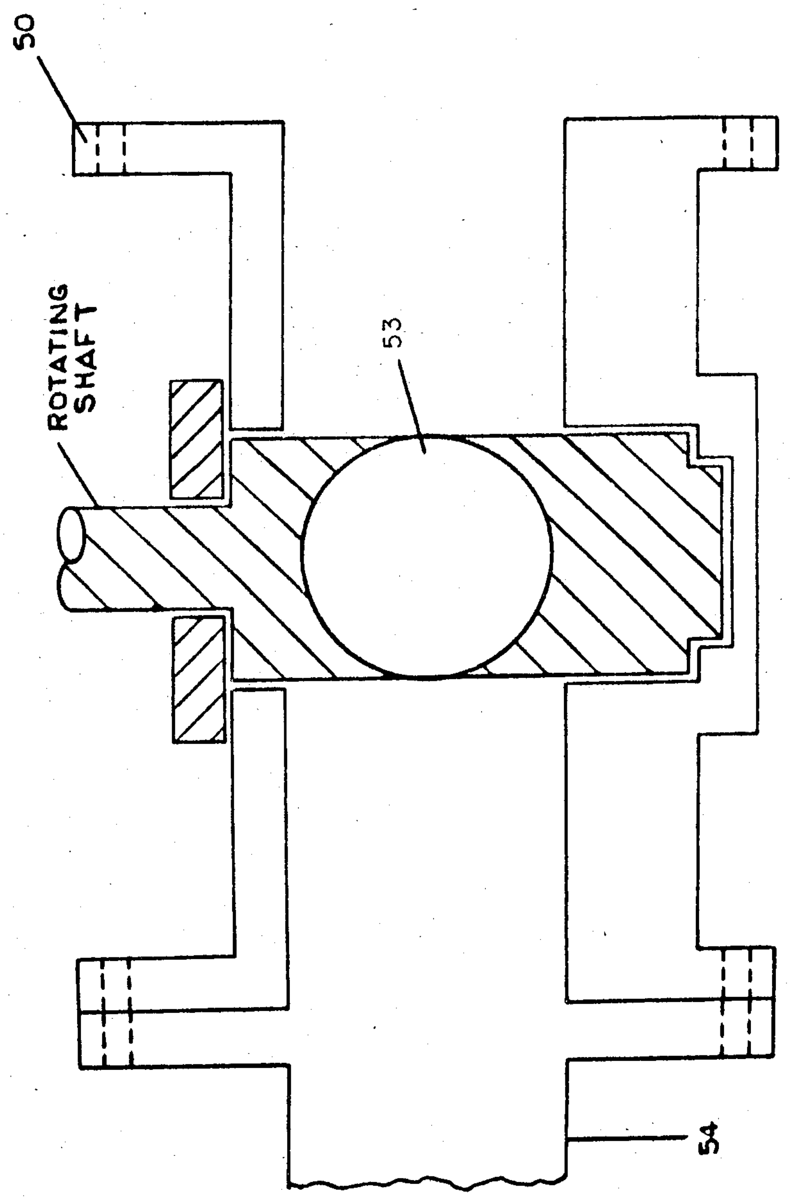
FIG. 12 is a schematic view of a pulsating valve.

FIG. 12 is an outline sketch of the pulsating rotary energizer valve 50. This valve is analagous to a rotating ball valve where the stem of the shaft is extended and coupled to a servo motor (not shown) which is controlled by a computer which receives its monitoring information from a lazer scanner (not shown) which monitors the speed, quantity, humidity and density of the cargo particulate being carried by the transport air in pipeline 20. As the cargo and measured operating conditions vary and change from point to point, the controllers vary the operations of the energizing valve 50 which in turn alters the encasement air characteristics.

When the shaft hole 51 is aligned longitudinally with the connecting pipe 54 there is full flow through the pipe into the energizing chambers 56 shown in FIG. 3. When the valve is rotated 90° it is considered closed and there is no flow.

The positions of the shaft hole can be infinite and when the valve shaft is rotating slowly it allows the flow passage through on a cycled count basis thus setting up and emitting an airstream which in turn sets up the pulsating air waves. The slower the rotation the more pronounced is the pulsating effect. The main shaft of valve 50 may be axially aligned, to also, control pulsating air waves.

As previously described, the pulsating flow entering the energizer chambers 56 is further and purposely pulsated by the effect of the air/gas volume variance diffuser plate 58. See FIG. 3.

The chamber 62 may be pressurized by any suitable means and preferably by the existing compressor/drivers of the system. A valve 51 may be used to control the flow of air into the chamber 62. The plate 58 extends along the length of pipeline 20. The plate terminates where the pipeline 20 begins or ends at stations 80 or 82, etc., or the pipeline is intercepted by spools 88, valves 24 or the like. Where the plate 58 ends within the pipeline 20 a plate segment is joined to the pipeline 20 with the chord of the segment joined to the edge of the plate 58 and the arc of the segment joined to the lower portion of the pipeline wall which defines the chambers 56 and 62.

In an alternative embodiment, referring to FIGS. 1 and 13, a jet nozzle 70A introduce the air into the transport pipeline 20 at the six o'clock position and at a 45° angle. At the location where the air from the nozzle 70A has completed a helical turn, additional air from a nozzle 70B is introduced; and at the location where the energizing air stream from nozzle 70B has completed a helical turn at 70Cl; air from nozzle 70C is introduced, etc. This forms a moving pulsating air encasement which inhibits the grain from precipitating from the transport air stream. In FIGS. 1 and 2 the system may use either the preferred embodiment or the alternate embodiment, the difference being primarily that in the preferred embodiment the plate 58 with or without the valve 50 controls the fluid flow characteristics of the pulsating air encasement and in the alternative embodiment the nozzles 70 with or without the valve 50 do the same. The horizontal axial rotors in the valves 70 rotate in a similar action as the vertical shaft in valve 50.

Where the particulates must be transported long distances, considerable amounts of air must be handled in order to introduce air into and withdraw air from the system without affecting the movement of the particulates. Also the air is laden with dust particles and particulate fines.

Referring to FIG. 14, a mechanical type by-pass separator-compressor/driver station 80 is shown in gresater detail. These stations condition the transport air stream to control flow rate of the transport air stream throughout the entire pipeline. Transport pipeline 20A discharges into a depressurizing tank 82. This tank serves two functions; it controls the pressure of the air flow into a compressor 84 and precipitates the grain from the air stream. Two streams are formed. A first air stream less the grain or particulate flows through a filter 86, an air-makeup injector 88 and into the compressor 84. The air-make up injector 88 (identical to injector 88 of FIGS. 1 and 16) comprises a flanged sleeve 90 and a plurality of hydraulically or air actuated trap doors 92; see FIG. 16. The air-makeup injector controls the air flow to the compressor to ensure, based on the specific compressor, that the transport air stream introduced into the primary pipeline 20, meets operating requirements; i.e., pressure and volume.

Figure 19:
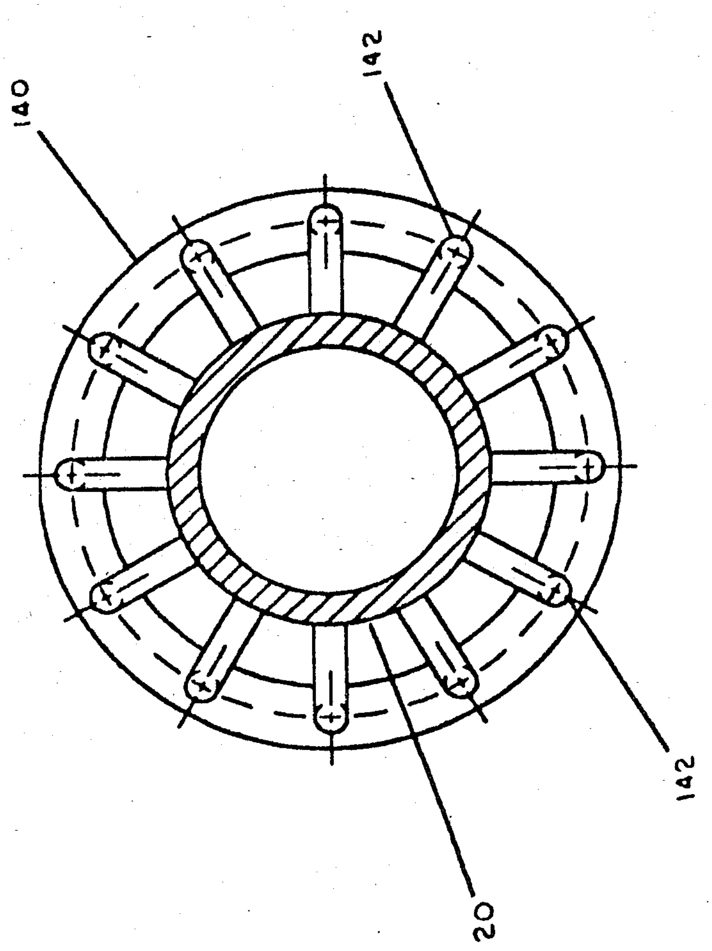
FIG. 19 is a sectional view of FIG. 18 taken along lines 18—18.

A second air stream carrying grain short-falls the compressor 84 and flows into discharge ducts 94A-C. Air lock valves 96A-C control the flow of grain directly onto a mechanical conveyor 98; or redirects the grain into the inlet side of a tangential cyclone separator 100; or both. The grain in the cyclone is redirected through its associated air locks and rotatable dispenser 102 and desposited on the mechanical conveyor 98. The mechanical conveyor 98 is received within the upstream end of the next succeeding section of the transport pipeline 20B. The mechanical conveyor is adapted to move the grain at a rate consistent with the flow rate of the grain moving through the entire pipeline. The air discharged from the compressor 84 flows into the pipeline 20B via a manifold assembly such as shown in FIGS. 18 and 19. Depending upon the particulates being transported a depressurizing tank per se may be sufficient; or a single or multicyclones without or with the tank may be sufficient. Other means to carry the particulates into pipeline 20B may be used pneumatic, floatation, etc.

FIG. 15 illustrates a dust removal system and a pneumatic bypass around the compressor/driver station wherein a cyclone(s) is used for a two step-cleaning process. Through pipeline 20A travels particulate, dust and air wherein the particulate is removed by cyclones 110. The air/dust combination in a pipe 112 travels to a cyclone 114 where the dust is removed and the cleaned air is further cleaned in filter 116 before going to the air intake injector 88 which is connected to the compressor 84. The cyclone 110 (commercially available) separates the transport air/solid stream into its basic elements of grain and dust laden air. The grain leaves the cyclone 110 through a volumetric wheel 118 where the feed rate is controlled by speed of rotation of the segmented compartment valve arrangement multiple system (see U.S. Pat. No. 2,827,333, Mar. 18, 1958, or Canadian Pat. No. 566,995, Dec. 2, 1958) and enters an entraining mechanism 120 through an air conveying conduit line 122. The mechanism 120 consists of a vacuum venturi air injector nozzle 124 (such as described in CEH P 230 FIG. 335) and receives the transport air from a compressor air discharge pipe 126.

The mechanism 120 is connected to the pipeline 20B with a flanged annulus 128 containing the angle air injectors 130 and could also be used as an in-line booster to compensate for any pressure drop.

The transport air stream would then increase in pressure and at the same time create a suction to assist in the movement of the particulate material. The air injector annulus would then be attached to the end of the entraining mechanism for creating the cushioning air stream by injecting energizing air through definite and defined passages 130.

If an intermediate loading point station was needed instead of a by-pass station, then the receiver bin 38 of FIG. 2 would be added to the cyclones 110 in FIG. 15. By closing the air locking valve system and the volumetric compartment arrangement, the entraining mechanism can be used to purge the primary pipeline 20 from foreign matter including dangerous gases, and small particles and/or to set up long intervals of air spaces within the transport pipeline to separate various grades of grain or different grains or particulates.

Between two adjacent compressor/driver stations, the flow of the primary air is a push/pull combination. Immediately downstream of a station the driving force is push. Immediately upstream of the next succeeding compressor/driver station the driving force is pull. The ratio is push to pull will of course depend upon pipe design, compressor driver ratings, and cargo weight, density and size of particulate. Preferably between adjacent stations the ratio of pull to push is high, such as 80/20; i.e., for 80% of the transport pipeline the grain is drawn through as in a vacuum-like atmosphere. Where the drive on the transport stream changes from push to pull a condition approching null will occur. At this location, additional air is introduced in sufficient quantity to form and maintain an encasement to insure the grain remains entrained until such time and it is carried and drawn by the primary air stream.

If desired, the design and compressor ratings may be adjusted so that the system is entirely pull or entirely push.

Referring to FIG. 1, the air make up injector spools 88 shown more clearly in FIG. 16 are placed in the transport pipeline. The injector comprises a sleeve 90 having a plurality of air or hydraulically-actuated vents 92. At start-up, auxiliary air is required while the grain is being sufficiently agitated until the system reaches equilibrium. The injector will allow the introduction of additional air in the primary pipeline and compressor by opening the vents 92. As the system approaches equilibrium the vents 92 will move to the various positions, including closed. When the entire injector 88 is reversed in its installation in the transport pipeline 20 it becomes an air/gas ejector and when the air or hydraulically actuated vents are opened, excess air/gas will escape. The buildup of excess air/gas will occur by the introduction of the energizing air from the energizing pipe 52. Here too the vents will assume varying positions from open to closed. The same spool may be so constructed to act as both an injector and ejector with a double row of vents 92 installed back to back of each other. The forward row would be injectors, the last row ejectors.

In addition to air control the injector-ejector "spool" is a control center for the measuring of operating data like; pressure, velocity, cfm, speed of cargo, distribution of cargo temperature, humidity, pressure encasement and so on. The instrument package will contain the normal electro-mechanical devices also the hi tech packages involving lazer counters, pulsator measurement, digital readouts, computers, calculators all working in concert with a central controller. The central controller will control compressor speeds, motors, the pressure build up, pulsating cycles, the rotary air valves and other internal devices not mentioned.

The following will exemplify a working embodiment of my invention with reference to FIGS. 1 to 12.

Various pipeline diameters have been studied from 10" to 60" and it is necessary to establish two basic criteria; the cargo movement should approximate 5,000 tons of particulate per hour and the encasement air should travel much faster (twice) than the speed of the cargo itself. Also, the cargo size is generally proposed as less than ¼" cubed and the specific gravity is preferably less than 1.75 to 2.00. The lower the operating pressure the better are the results. Pressure of 50 psig were used to calculate the discharge cfm from the orifices of the plate of FIG. 6.

In large pipeline applications it appears the transport cargo pipeline 20 may require diameters to 50" while the parallel connected energizing pulsation pipeline (52) could be of smaller diameters say 10–16".

The main operating principle of the air swirler encasement system is the transport air and cargo travel at a slower speed (1200 fpm) while the encasement energizing pulsating air travels at a much higher speed of two or three times the transport air and cargo. The transport air decreases in pressure due to frictional losses which are compensated by the periodic injection, at regular intervals (say 500') of energizing encasement air at higher pressures. Eventually, the whole mass of transport air, cargo and energizing air is in a "speeded up" mode which must be slowed or braked by the emission of air through the ejectors 88. As an example—if the encasement air remained uncontrolled, with the air entering at a given pressure at a velocity of 2400 fpm, it will flow at 2675 fpm within a mile and flow at 5144 fpm within 10 miles. Thus, requiring a controlling mechanism such as the ejectors are required.

Therefore, because of the volume of additional air introduced via the diffuser plate, the ejector spools are used, where the escaping excess air will diminish the volume and therefore the mass velocity. In the preferred embodiment the velocity of the encasement air is allowed to increase two or three times the optimum velocity of the transport air stream at which time air is ejected from the system to ensure that the pulsating air encasement is always within a given range.

Although described in reference to a circular cross-sectional pipeline, various cross-sectional shapes of pipelines may be used alone or in combination and the air may be introduced at any angle less than 90° rather than specifically 45° as shown. Additionally, if desired, depending upon the particular material being transferred and the gases being used, it may be advantageous to coat the inside of the pipeline to enhance the flow characteristics of the secondary gas stream to maintain the sleeve-like cushion effect. The inside of the primary pipeline may be baffled by the use of fins or ribs extending inwardly from the inner surface of the pipeline in a helical configuration, either continuous or discontinuous; or alternatively, the inside of the pipeline may be rifled (grooved) in a helical configuration, either continuous or discontinuous. Additionally, the inner surface may be corrugated with the roots and the crests of the corrugations axially aligned with the longitudinal axis of the pipeline or offset at an angle thereto including a corrugated effect at right angles to the longitudinal axis of the pipeline. Any combination of coatings and/or baffles may be used as will be apparent to those skilled in the art.

For startup of a pipeline which is partially filled with grain, the initial velocity and pressure of the energizing air stream introduced into the pipeline to form the encasement may be much greater than after equilibrium has been achieved in order to create enough turbulence to raise the grain from the air/gas volume variance diffuser plate of the pipeline such that it is carried by the transport air stream. As previously discussed the chamber 62 is energized. This enhances the movement of particulates from the floor at start up. After equilibrium conditions have been reached, then the flow through the pulsating rotary valves 50 may be diminished.

Figure 20:
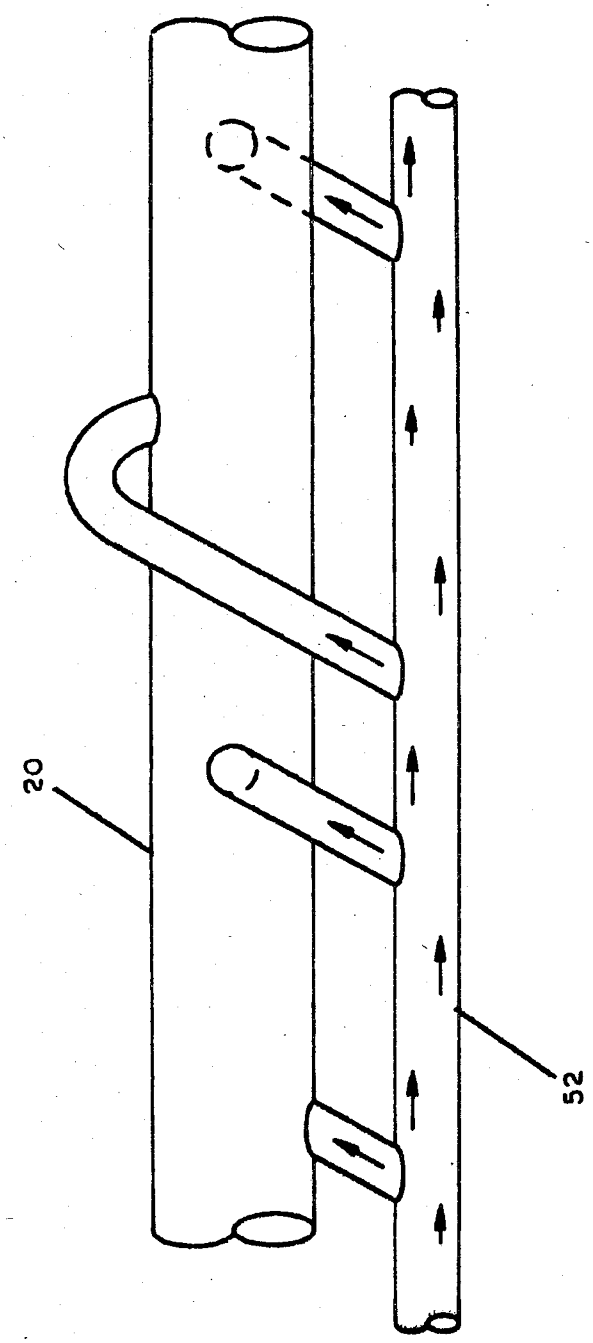
FIG. 20 is a side view of a still further embodiment of the invention.

One or more pipe-nozzle combinations for the sleeve of air may be placed about the primary pipeline. Referring to FIG. 18, a manifold 140 is disposed about a primary pipeline and a plurality of nozzles 142 discharge air streams along the inner wall to form the sleeve of air in a direction parallel to the flow of the transport air stream. The discharge of the airstreams may, as just described be parallel for all nozzles or one or more of the nozzles may be adapted to direct the air stream in different directions as desired. Additionally, the manifold 140 may be placed interiorally of the primary pipeline and although this would increase pressure drops (which would be compensated for), it would lessen costs and facilitate ease of construction. Another embodiment is shown in FIG. 20 wherein the air stream conduits are disposed axially in different quadrants along the primary pipeline.

Figure 21:
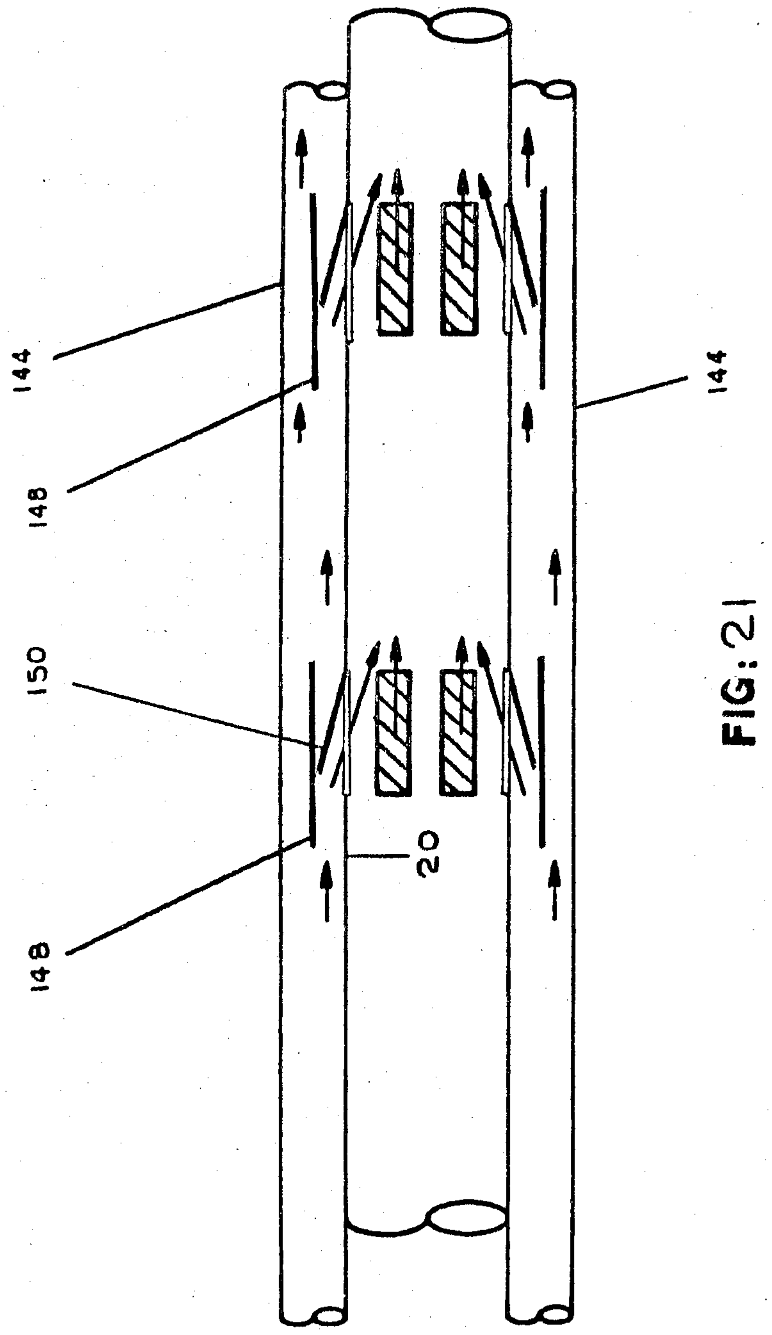
FIG. 21 is a side view of a still further embodiment of the invention.

In FIG. 21, the energizer pipes 144 are affixed to a transport pipeline 20. Nozzles 148 discharge air circumferentially into the transport pipeline through cover plates 150 which may be adjusted for air requirements.

Figure 22:
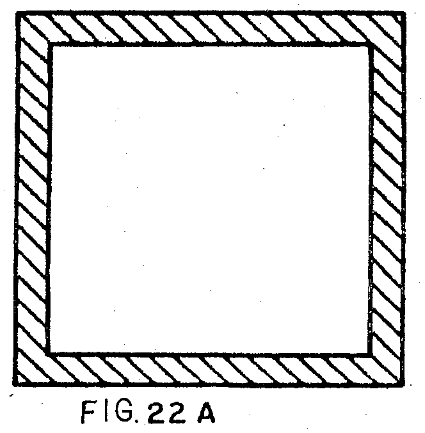
FIGS. 22A through D are front sectional views of various pipeline cross sections.
Figure 22:
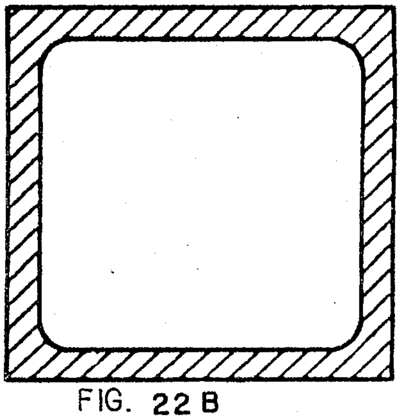
Figure 22:
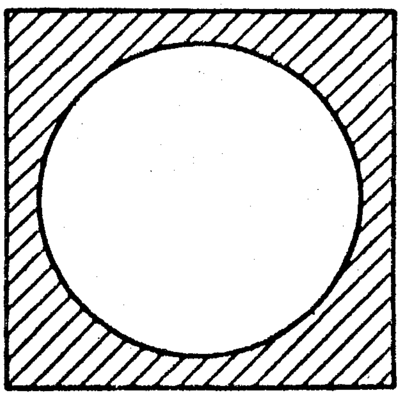
Figure 22:
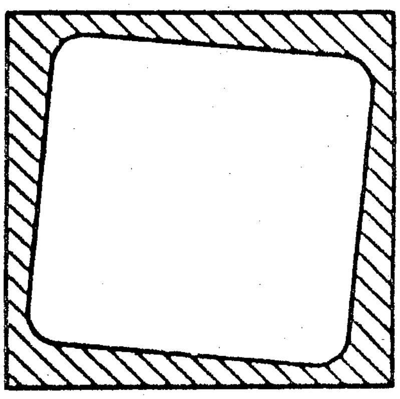

Primary pipelines may be used in combination to transport the same or different particulate materials. In FIGS. 22A–D pipelines of various cross sections are illustrated; FIG. 22A is square; FIG. 22B is a rounded square; FIG. 22C is an offset rounded square; and FIG. 22D is a circle as in the preferred embodiment.

FIG. 23 illustrates a multi-pipe system where one or more of the primary pipelines 150, 152, 154, and 156 is supported individually by an energizing, pulsating pipeline 158, 160, 162, and 164 respectively.

In FIG. 24, taken along line 23—23 of FIG. 23, the energizing pulsating pipeline 162 is connected by nozzle 170 to pipeline 154 and the energizing pulsating pipeline 164 is connected by nozzle 168 to pipeline 156. The secondary stream of air through nozzle valves 168 and 170 are introduced at about the 6 o'clock position and at a 45° angle.

In FIG. 13, the introduction of the secondary stream is more clearly illustrated.

In FIG. 25, the multi-pipeline shown in FIG. 23 is illustrated mounted on a crossbeam support 180 supported in turn by columns 182 and 184. Also illustrated is provision for future pipeline 186 and secondary pipeline 188.

The invention has been described in reference to the movement of grain and particularly wheat. Other particulates which are within the scope of the invention by way of illustration are beans, coffee, soy, etc.; potash, straw, coal dust, saw dust, etc.

The size and density of the particulates will vary. Grain sizes and densities are generally well defined. Coal or other particulates will vary in size and density. However, a dense pack ratio may be calculated for any particulates, such as coal, and process modifications such as flow rates, pressures, etc. would be within the skill of the art and are within the scope of this invention.

Have described my invention, what I now claim is:

1. A method for transporting particulates which includes:

moving a transport air stream through a pipeline;

entraining in said transport air stream the particulates;

introducing energizing air in opposed directions into the pipeline at a rate and in an amount to form a forward leaning pulsating-air encasement between the inner wall of the pipeline and the transport air stream, wherein the pulsating effect is created by:

flowing the energizing air into a chamber; and discharging the air from the chamber into the pipeline through a plate having a plurality of orifices wherein the air flows at various rates, pressures and angles with reference to a vertical plane;

maintaining the velocity of the energizing air stream at a greater rate than the velocity of the transport air stream whereby the precipitation of the particulates from the transport air stream is inhibited; and removing the particulates from the air stream.

2. The method of claim 1 wherein the dense pack ratio of volume of particulate to volume of air is less than 50 percent.

3. The method of claim 2 wherein the dense pack ratio is not more than 30 percent.

4. The method of claim 1 which includes:

varying the flow rate of the energizing air entering into the chamber.

5. The method of claim 1 which includes:

introducing the energizing air at a plurality of spaced locations into the pipeline.

6. The method of claim 1 which includes:

introducing the energizing air at acute angles to the flow of the primary air stream with reference to the longitudinal axis of the pipeline.

7. The method of claim 1 which includes:

introducing air in the lower portion of the pulsating air encasement in a direction forward and upward with reference to a longitudinal axis of the pipeline to enhance control of the particulates flowing through said pipeline.

8. The method of claim 1 which includes:

conditioning the energizing air to control the temperature and humidity of the transport air stream.

9. The method of claim 1 which includes:

separating the transport air stream into two air streams, an air stream-less particulates and, an air stream carrying particulates, conditioning the air stream-less particulates and combining the air stream-carrying particulates with the conditioned air stream to form a transport air stream.

10. The method of claim 9 which includes:

adding makeup air to said air stream-less particulates.

11. The method of claim 9 which includes:

compressing the air stream-less particulates.

12. The method of claim 1 which includes:

drawing the transport air stream through the pipeline.

13. The method of claim 1 which includes:

pushing the transport air stream through the pipeline.

14. The method of claim 1 which includes:

moving the transport air stream through the pipeline by pushing the transport air through a first distance; and drawing the transport air stream through a second succeeding distance.

15. The method of claim 14 wherein the flow of the transport air approaches a null condition at the location where the movement of the transport air changes from a pushing force to a drawing force and which further includes:

introducing makeup air to inhibit the precipitation of the particulates in said null condition.

16. The method of claim 1 wherein maintaining the velocity of the energizing air stream at a fixed ratio with reference to velocity of the transport air stream includes:

discharging periodically from the pipeline the energizing air.

17. The method of claim 1 wherein the particulates are grains.

18. The method of claim 17 wherein the grains are wheat.

19. The method of claim 1 wherein the transport air stream carries less than 30% by volume grains.

20. The method of claim 1 wherein the particulates are coal.

21. A system for the pneumatic transportation of particulate matter which comprises;

(a) a pipeline;

(b) means to flow a transport air stream through said pipeline;

(c) means to introduce into said transport air stream particulate material, wherein a portion of the wall of said pipeline defines a plate, said plate having a plurality of orifices having various sizes, said orifices being disposed at a plurality of different angles with reference to a vertical plane;

(d) means to introduce energizing air in opposed directions into said pipeline at a rate in a direction and in an amount to form a forward leaning pulsating air encasement between the inner wall of the pipeline and the transport air stream and to maintain the velocity of the pulsating air encasement at a greater velocity than the transport air stream to prevent precipitation of the particulates from the transport air stream;

(e) said means to introduce energizing air comprising a chamber connected to and in flow communication with the pipeline by means of said plate; and (f) means to remove the particulates from the transport air stream.

22. The system of claim 21 wherein the chamber comprises two energizing chambers and a booster chamber disposed between said energizing chambers the means to introduce the booster air to the lower portion of the pipeline is in communication with said booster chamber and wherein the plate is characterized by a plurality of apertures therein through which the booster air flows from the booster chamber into the pipeline in a forward and upward direction to enhance control of the flow of particulates through the pipeline.

23. The system of claim 21 wherein the means to introduce the energizing air into the chamber comprises a valve adapted to introduce the air into the pipeline in a non uniform flow rate.

24. The system of claim 21 which comprises:

means to discharge excess air from the transport pipeline.

25. The system of claim 21 which includes:

means to separate the transport air stream into an air stream less particulates and an air stream carrying particulates;

means to condition the air stream less particulates; and means to combine the conditioned air stream and the air stream less particulates to prior a transport air stream.

* * * * *